April 9, 1935.  L. F. NENNINGER ET AL  1,997,338
MILLING MACHINE
Filed Sept. 28, 1929   14 Sheets-Sheet 1
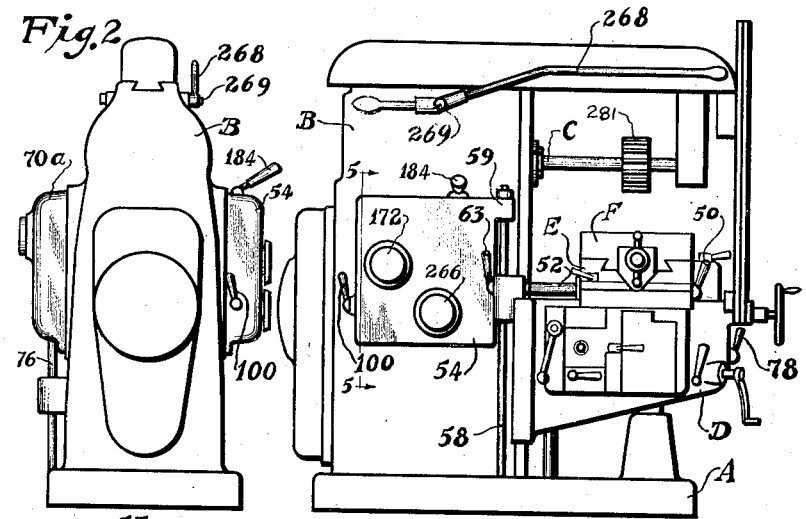
Fig. 2
Fig. 1
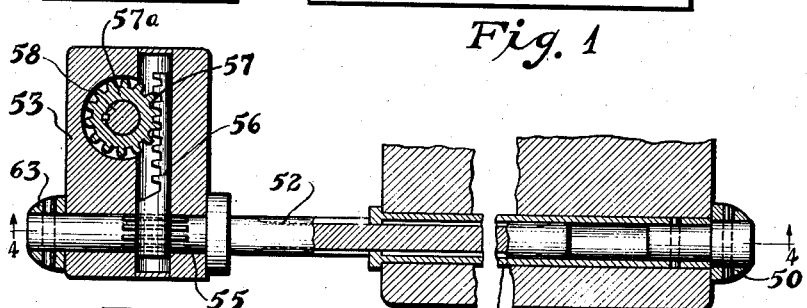
Fig. 3
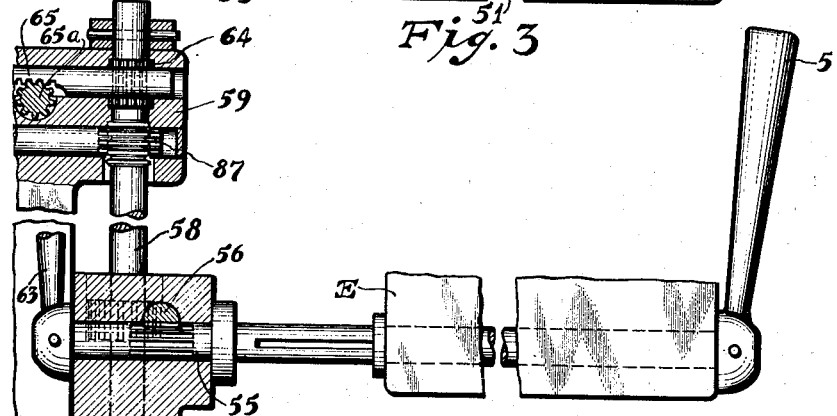
Fig. 4
Inventors
LESTER F. NENNINGER
SOL EINSTEIN
By A. H. Parsons
Attorney

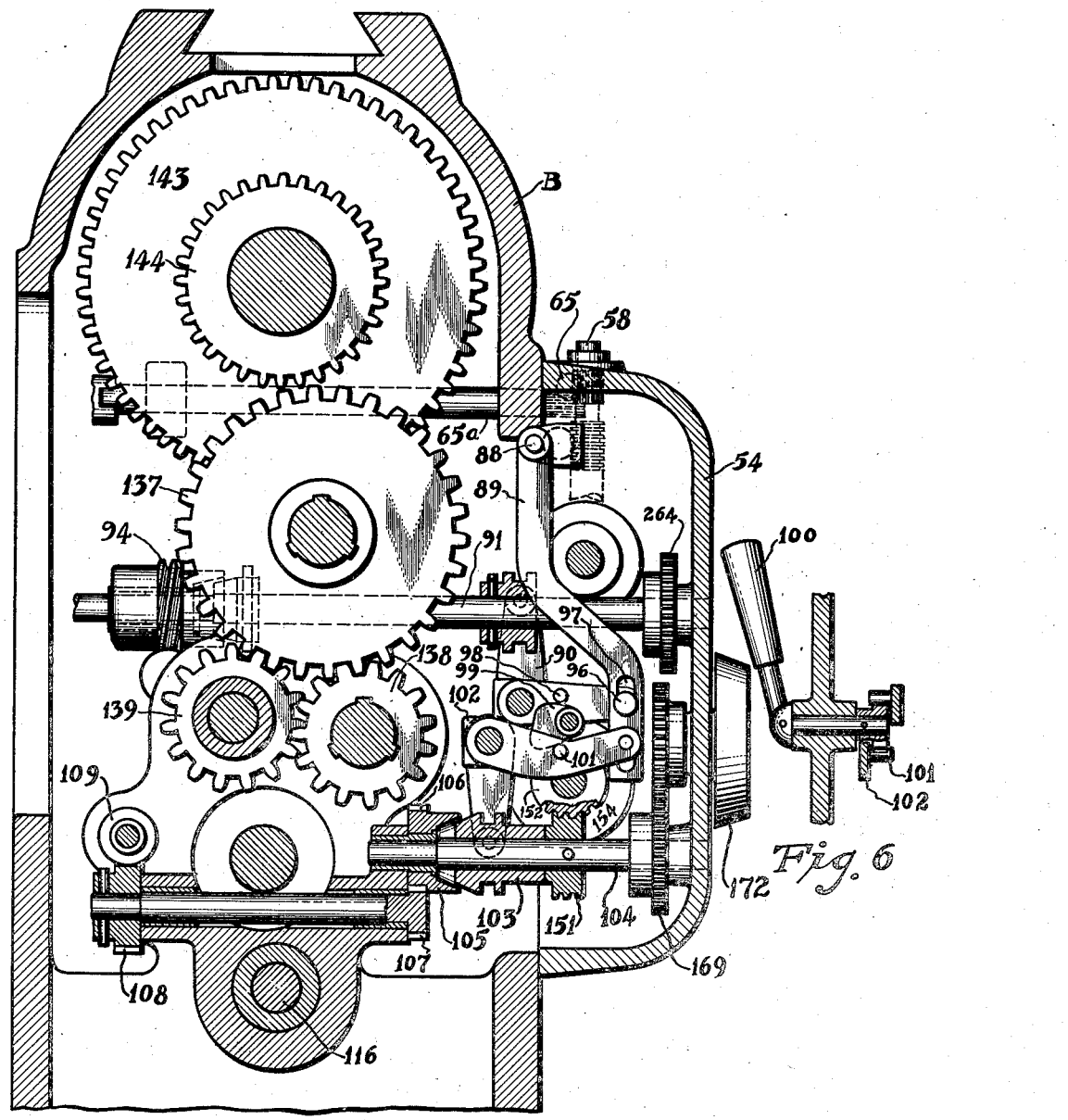

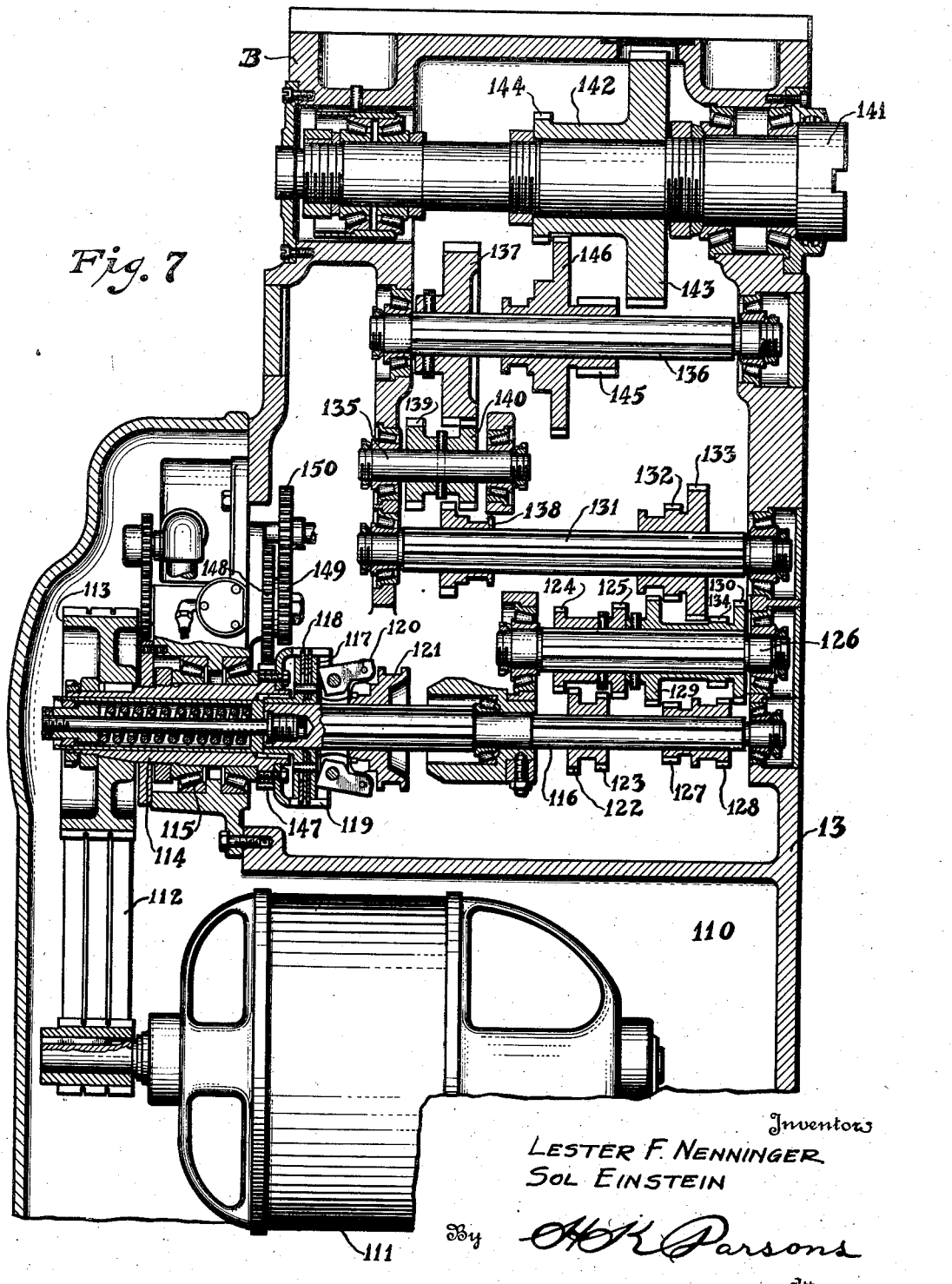

Inventors
LESTER F. NENNINGER
SOL EINSTEIN
By H. K. Parsons
Attorney

April 9, 1935.  L. F. NENNINGER ET AL  1,997,338
MILLING MACHINE
Filed Sept. 28, 1929    14 Sheets-Sheet 5
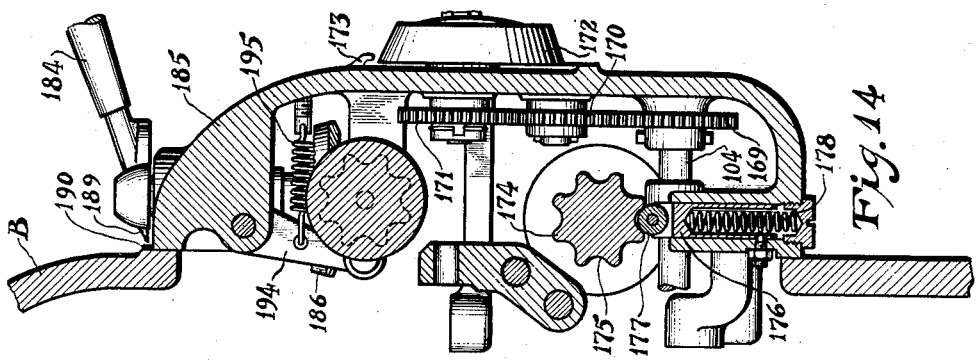
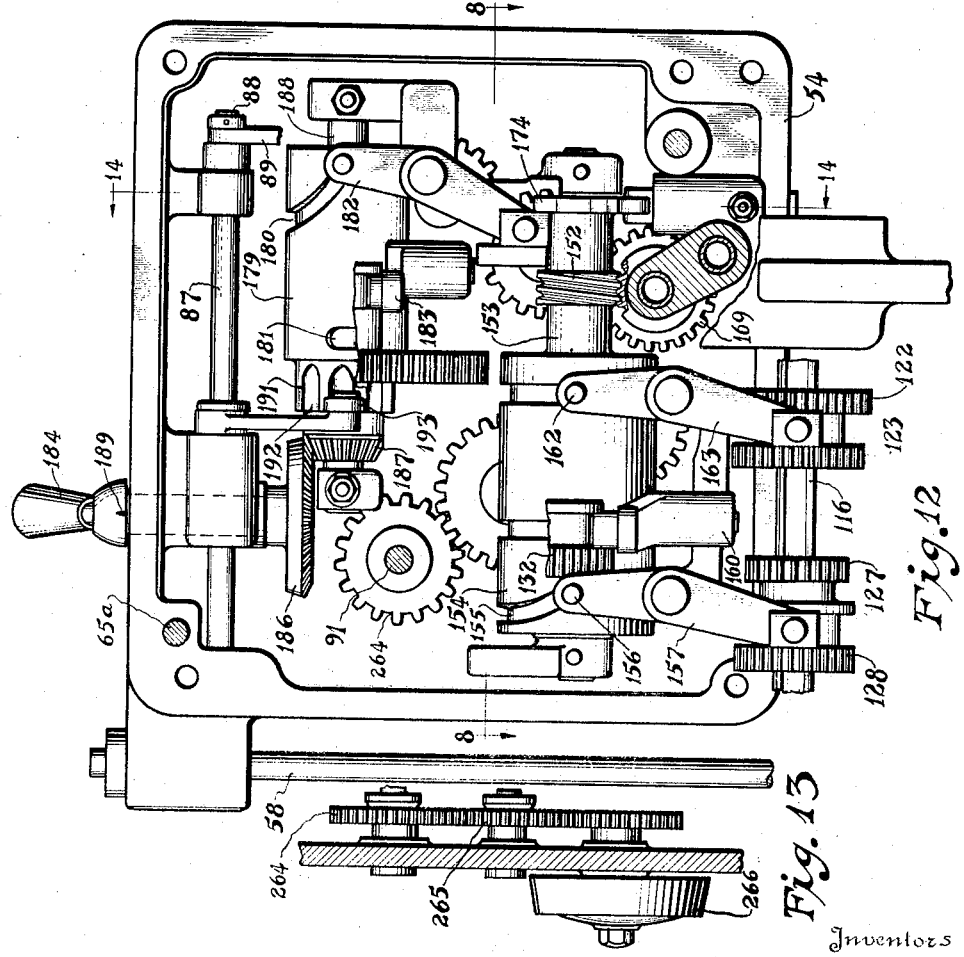
Inventors
LESTER F. NENNINGER
SOL EINSTEIN
By H. K. Parsons
Attorney

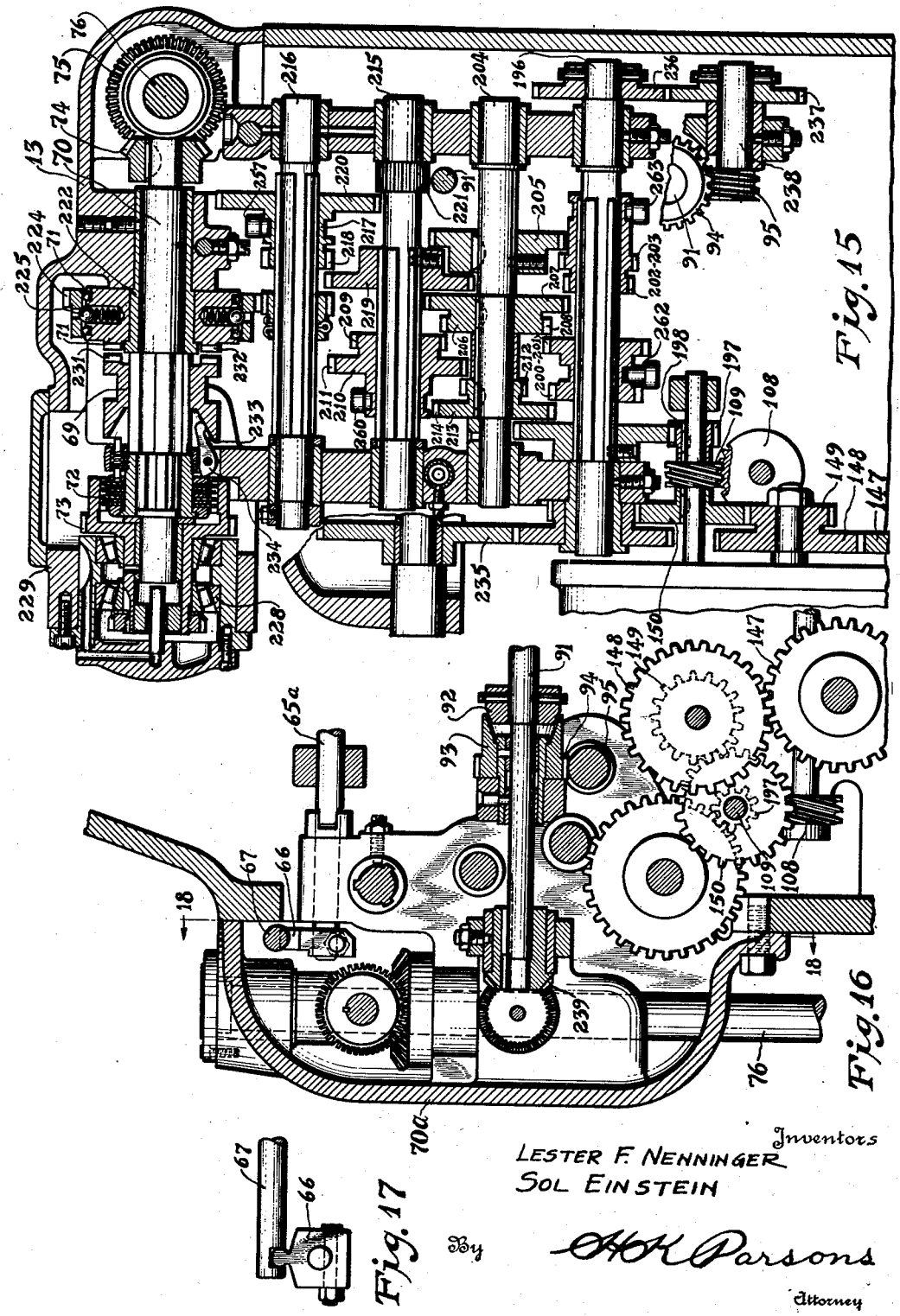

Inventors
LESTER F. NENNINGER
SOL EINSTEIN

By A. H. Parsons
Attorney

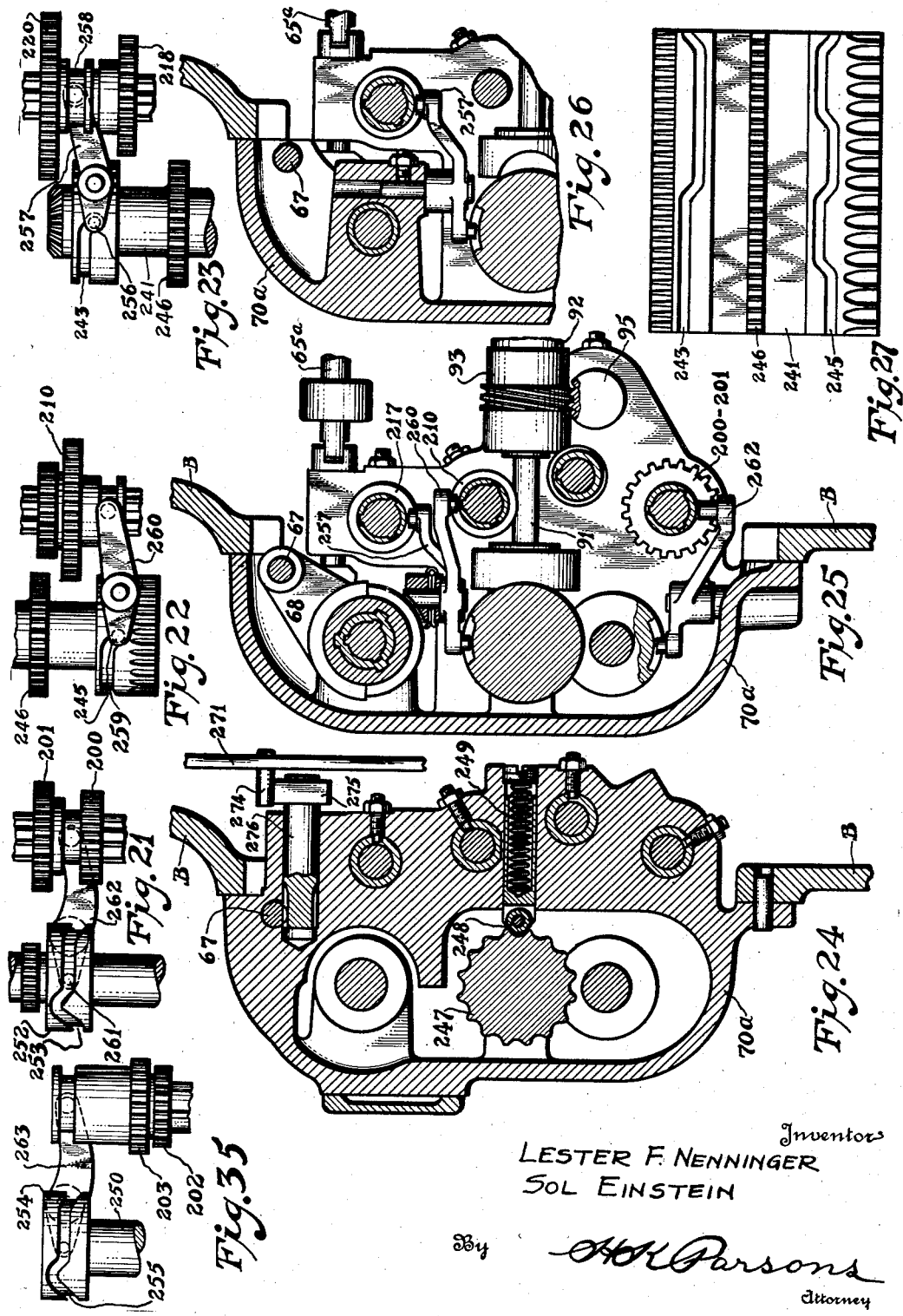

April 9, 1935.  L. F. NENNINGER ET AL  1,997,338
MILLING MACHINE
Filed Sept. 28, 1929   14 Sheets-Sheet 9
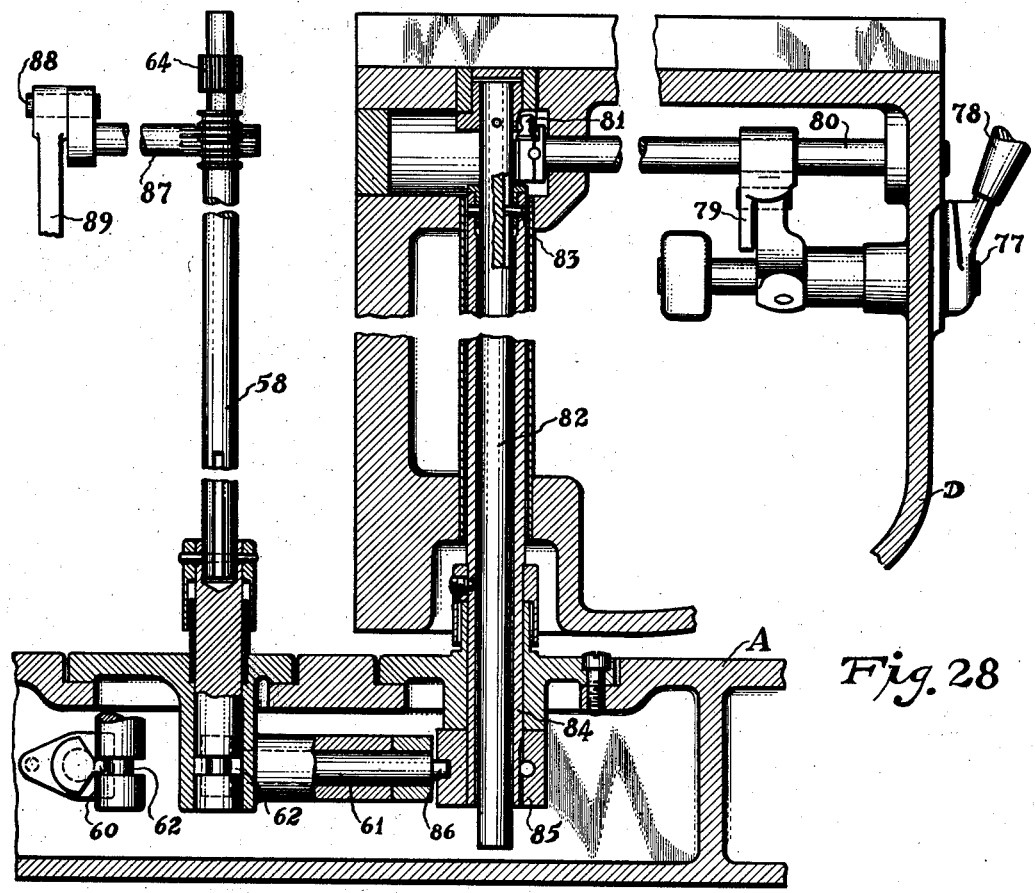
Fig. 28
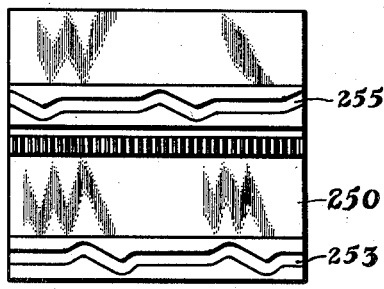
Fig. 30
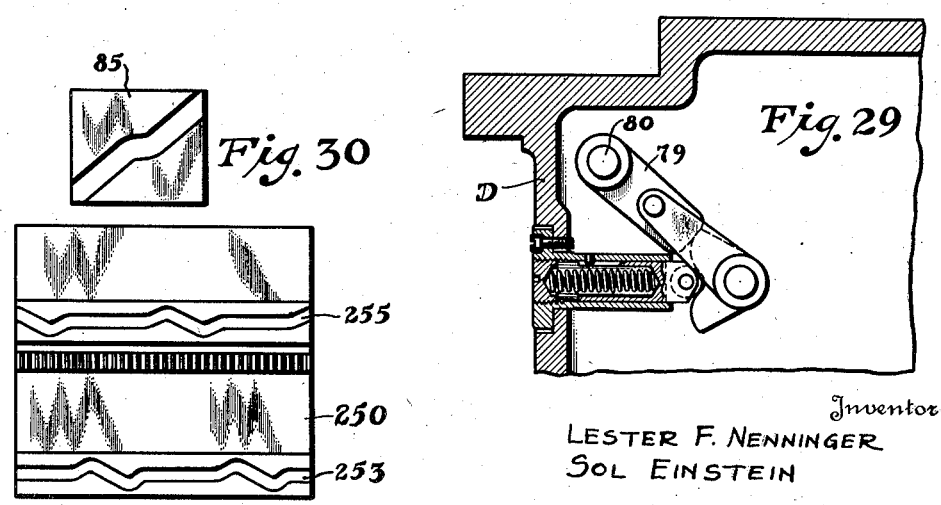
Fig. 29
Fig. 31
Inventors
LESTER F. NENNINGER
SOL EINSTEIN
By A. H. Parsons
Attorney.

April 9, 1935. L. F. NENNINGER ET AL 1,997,338
MILLING MACHINE
Filed Sept. 28, 1929 14 Sheets-Sheet 10
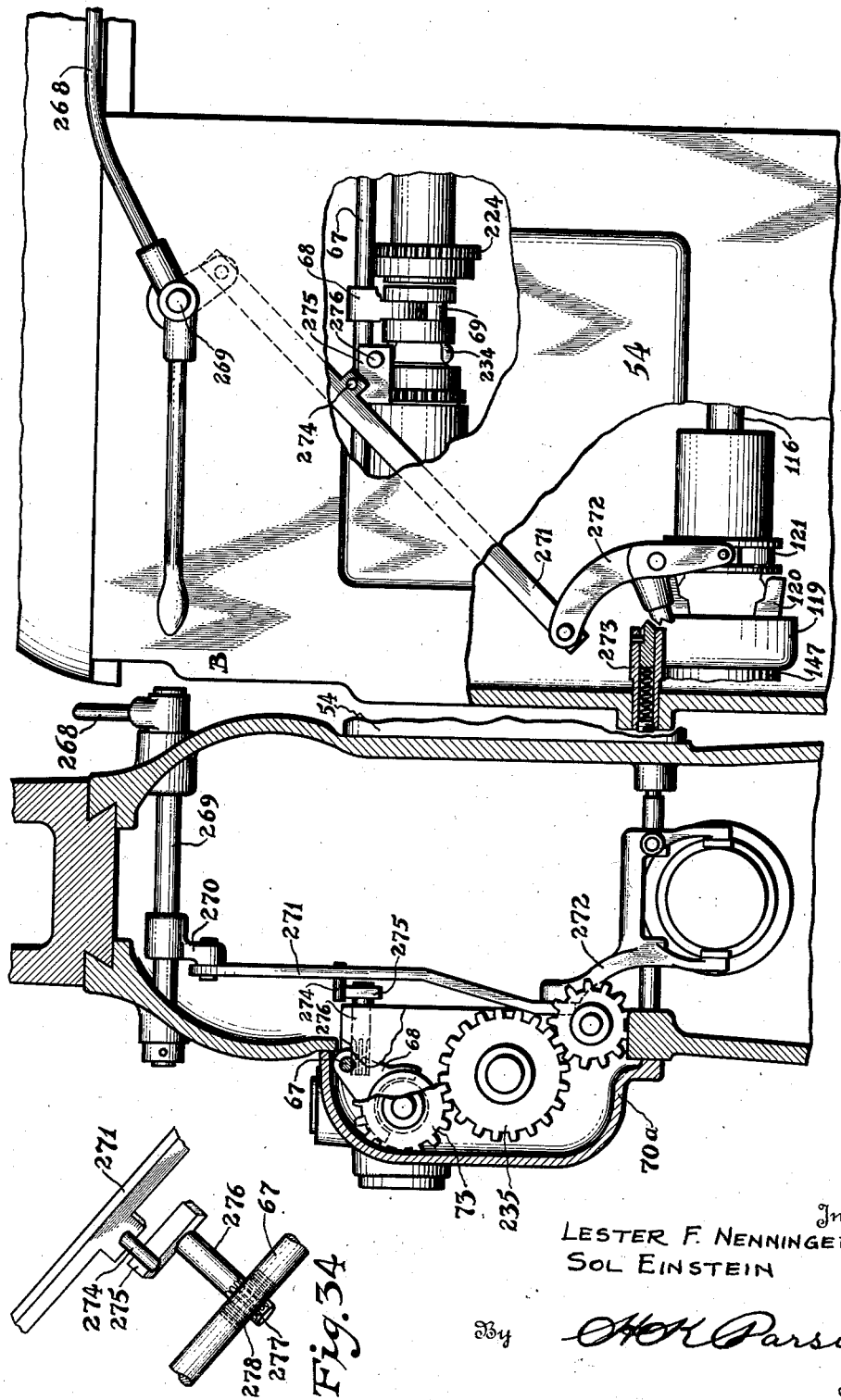
Inventors
LESTER F. NENNINGER
SOL EINSTEIN
By AHR Parsons
Attorney

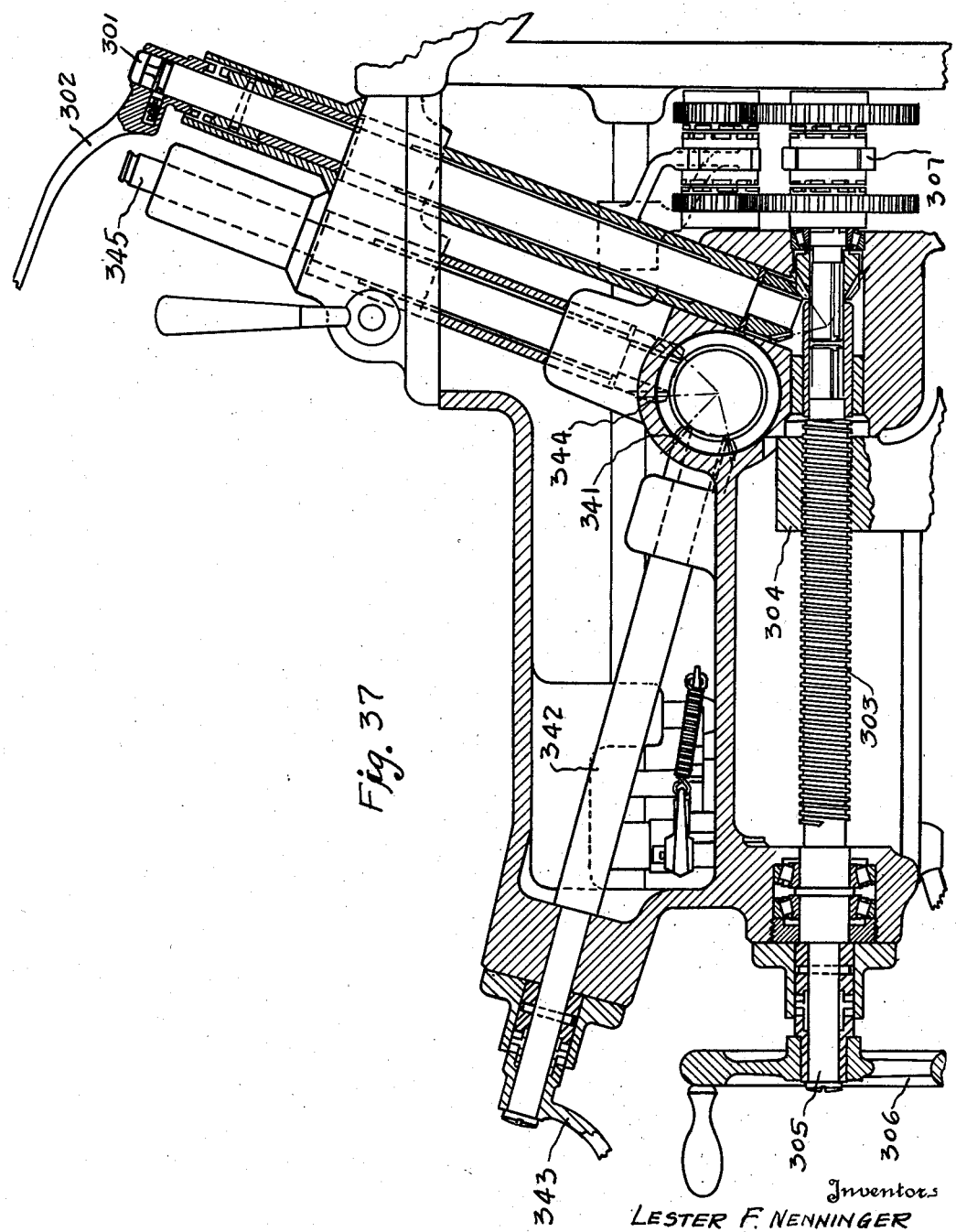

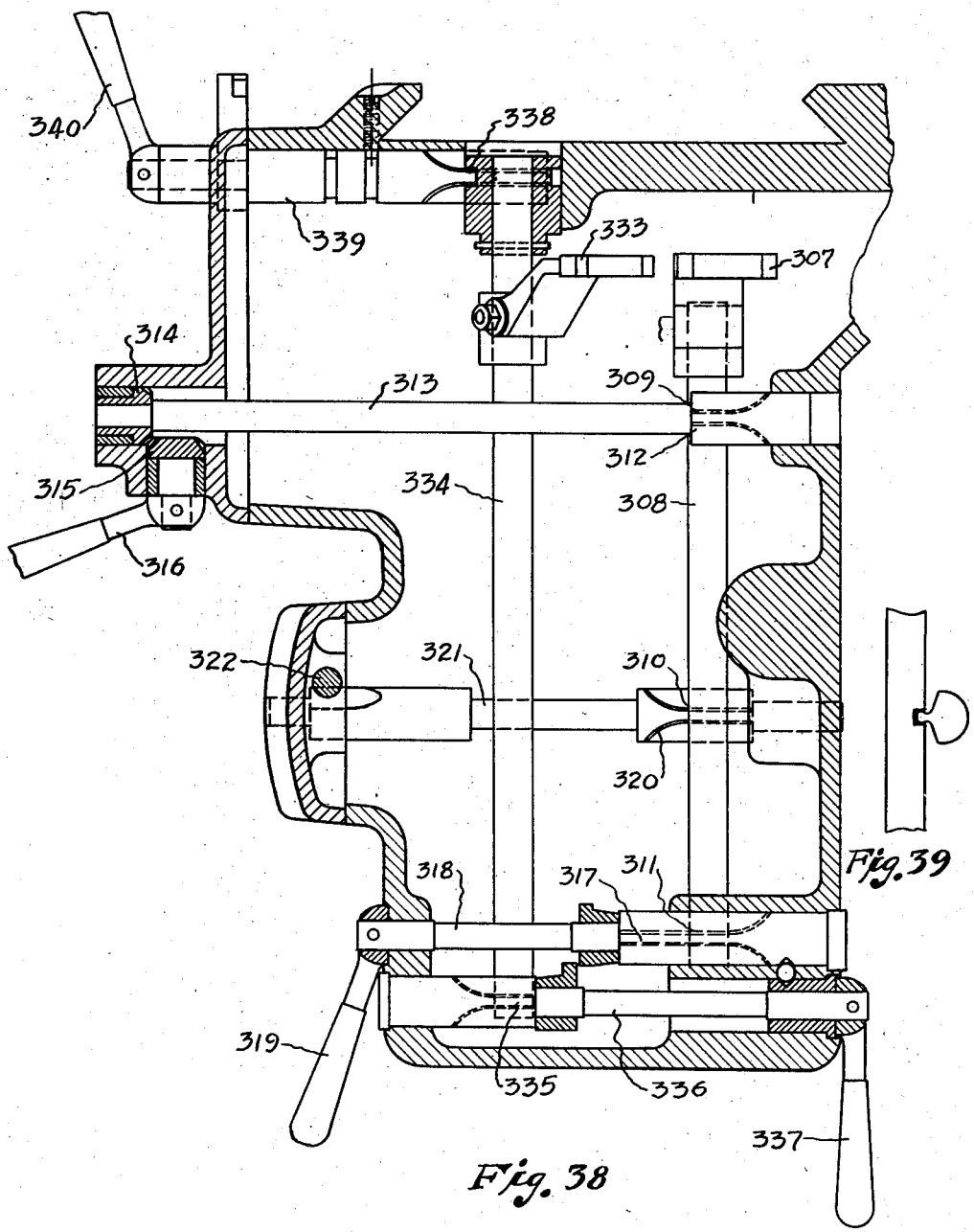

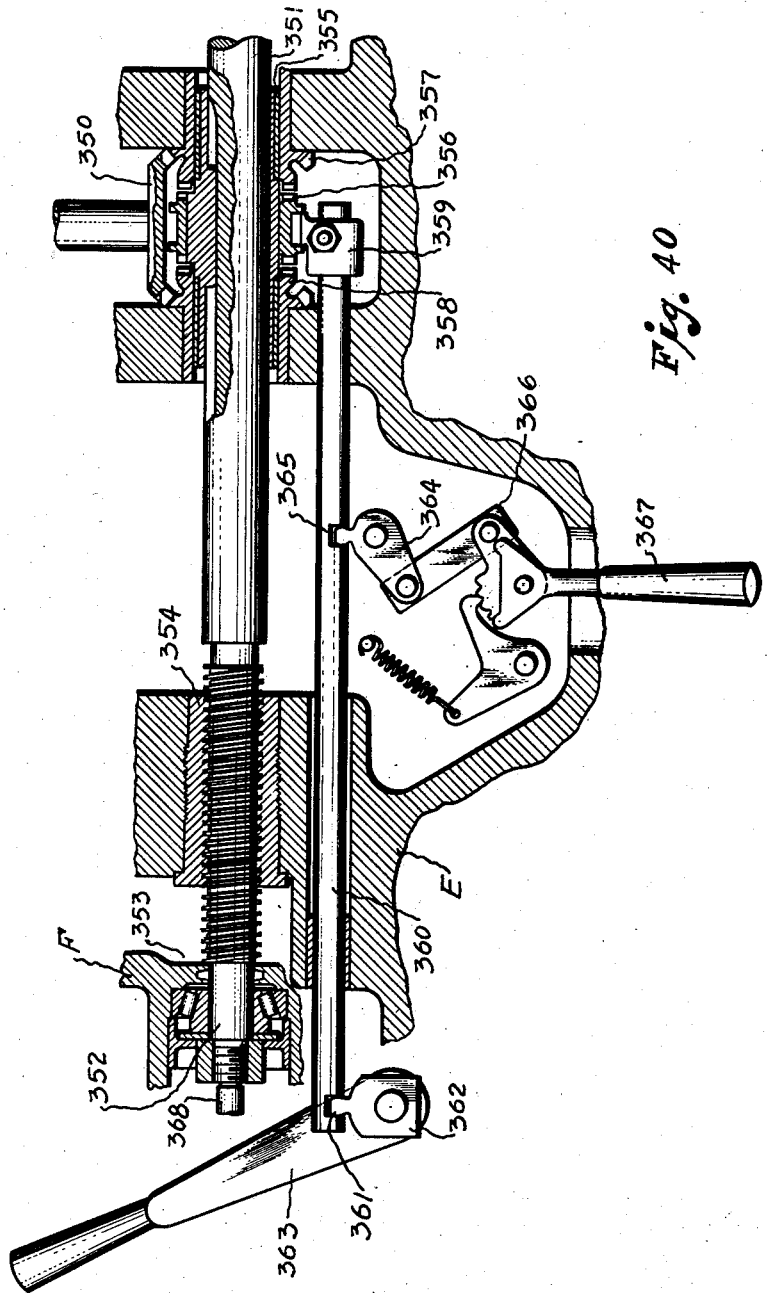

Patented Apr. 9, 1935

1,997,338

UNITED STATES PATENT OFFICE 1,997,338

MILLING MACHINE

Lester F. Nenninger and Sol Einstein, Cincinnati, Ohio, assignors to The Cincinnati Milling Machine Company, Cincinnati, Ohio, a corporation of Ohio Application September 28, 1929, Serial No. 395,928

44 Claims. (Cl. 90—21)

This invention relates to improvements in machine tools and has particular reference to the actuating mechanism therefor.

One of the principal objects of the present invention is the provision of an improved control mechanism for milling machines or other machine tools which will greatly facilitate and minimize the time required for effecting adjustment of the various parts thereof.

Another object of the invention is the provision of improved power actuable mechanism for most rapidly and selectively determining the rate of actuation of a given part of the tool.

A further object of the invention is the provision of machine tool rate adjusting mechanism capable of power actuation to expedite the movement thereof, in which the final setting may be automatically effected to minimize the accuracy and attention necessary on the part of the operator in obtaining a given effect.

An additional object of the invention is the provision of a single control member available to selectively effect prescribed rate variations in different portions of the general machine tool drive transmissions.

Other objects of the invention include a simplification of the general drive transmissions, a reduction in the number of intermediate shifts necessary to effect a given range of speed and directional variations of actuation of a part, the provision of an improved transmission which will permit of selective discontinuance of certain of the operative branches of the transmission while rendering other branches thereof constantly available, and of an improved mechanism for effecting different spindle rotation rates and different translatory movement rates through a combination of automatic, manual and manually controllable mechanism which will greatly facilitate attainment of the ultimate desired results by the operator.

Other objects and advantages of the present invention should be readily apparent by reference to the following specification, considered in conjunction with the accompanying drawings illustrative of one embodiment thereof, but it will be understood that we may make any modifications in the specific structural details hereinafter disclosed, within the scope of the appended claims without departing from or exceeding the spirit of the invention.

Figure 1 is a side elevation of a milling machine embodying the present improvement.

Figure 2 is a rear view thereof.

Figure 3 is a fragmentary horizontal section illustrating the front and rear quick traverse control mechanism.

Figure 4 is a fragmentary view in elevation and partially in section as on line 4—4 of Figure 3.

Figure 5 is a transverse section through the spindle speed variator box and general clutch control mechanism, as on the line 5—5 of Figure 1.

Figure 6 is a fragmentary section through the manual selector clutch control mechanism particularly illustrated in Figure 5.

Figure 7 is a developed sectional view through the spindle drive gearing.

Figure 12 is a horizontal section illustrating the operative relation of the control cams specifically illustrated in Figures 8 and 10.

Figure 13 is a detail section illustrating the drive for the speed indicating dial.

Figure 14 is a vertical section on line 14—14 of Figure 12.

Figure 15 is a sectional development of the variable speed drive transmission to the translatable parts of the machine tool such as the saddle, knee and table.

Figure 16 is a vertical section through the feed box.

Figure 17 is a fragmentary view illustrating the coupling of certain of the control members.

Figures 21, 22 and 23 are fragmentary views of the individual cams, shifter yokes and gear units controlled thereby.

Figure 24 is a section through the feed box illustrating the action of the actuator-detent as on line 24—24 of Figure 19.

Figure 25 is a corresponding section in a different plane through certain of the control members.

Figure 26 is a corresponding view illustrating the operative connection of the shifter yoke illustrated in Figure 23.

Figure 27 is a development of the central cam unit of Figure 19.

Figure 28 is a detailed vertical section of the rate changer control train from the front of the machine.

Figure 29 is a detail of the automatic neutralizer.

Figure 30 is a development of one of the motion transmitting cams.

Figure 31 is a development of the control cam particularly illustrated in Figure 20.

Figure 32 is a side elevation with parts broken away illustrating the automatic feed drive knockout mechanism.

Figure 33 is an end elevation of the knockout mechanism shown in Figure 32.

Figure 34 is a fragmentary perspective view of the knockout mechanism.

Figure 35 is a fragmentary view of one of the control cams and the shifter yoke and gear unit controlled thereby.

Figure 37 is a horizontal section illustrating the power and manual connections for imparting movement to two of said translatable units.

Figure 38 is a semi-diagrammatic sectional view illustrating the coupled front and rear station levers for controlling power actuation of two of the translatable units.

Figure 39 is a fragmentary view illustrating the operative connection between the shifter rod and actuator therefor, and Figure 40 is a fragmentary vertical section through a portion of the saddle illustrating the means for controlling translation of the work supporting table theron.

Figure 8:
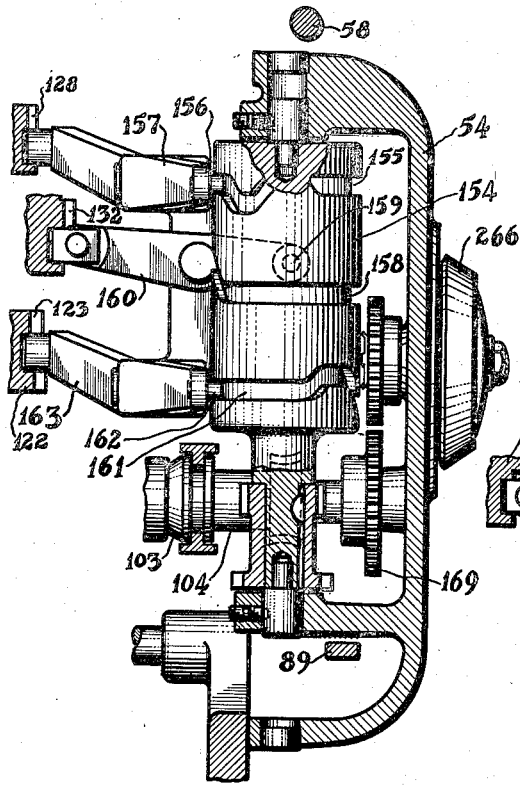
Figure 8 is a section as on line 8—8 of Figure 12, illustrating the spindle speed control cam.
Figure 10:
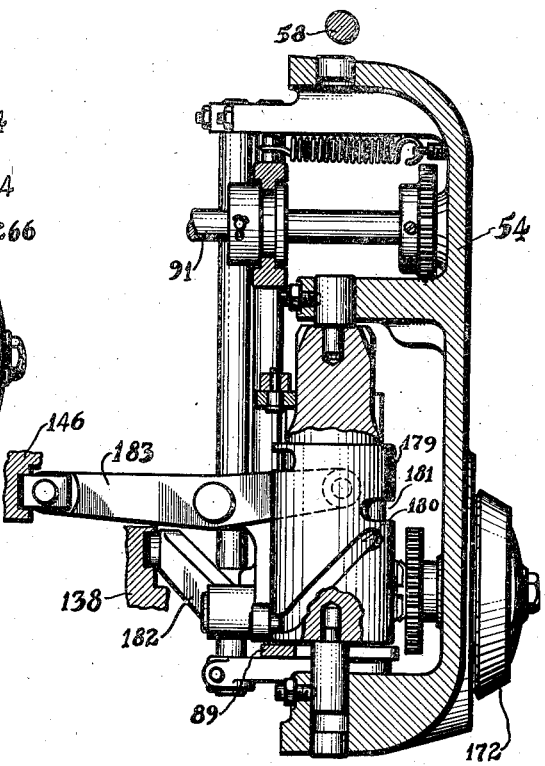
Figure 10 is a view similar to Figure 8 illustrating the back gear and reverse control cam.

In the drawings, the principles of the present invention have been shown in a specific embodiment as applied to a milling machine, including a bed A having a column B within which is journaled a spindle C. The column is provided with ways on which a knee D is vertically movable and in turn supports a saddle E for in and out movement or translation on the knee. A second translatable unit or table F is mounted on the saddle, suitable power drive being preferably coupled with the knee, saddle and table to effect desired translatory movements thereof, so that the distance between the table and spindle may be varied and, in addition, the work supporting portion of the table may be given translatory movements both parallel with and transversely of the axis of cutter spindle C.

In the drawings, in which similar characters of reference are employed to denote corresponding parts throughout the several views, the numeral 50 designates a control handle, in this case intended to determine quick traverse movement of a selected part. The handle is carried by a sleeve 51 mounted in the saddle, within which telescopes shaft 52 extending rearwardly from the saddle through a bearing block 53 supported by the knee D adjacent the feed box unit 54, illustrated as disposed upon the column. Shaft 52 has a pinion 55 meshing with a rack portion on plunger 56 having an additional rack, as at 57, which meshes with a gear 57a operatively connected with a vertical splined shaft 58 which is slidably and rotatably supported at its upper end by lug 59 of the feed box and by engagement therewith, at its lower end, of lug 60 on rock shaft 61 with groove 62 in member 58, as is particularly illustrated in Figure 28 of the drawings. It will thus be seen that in and out movement of the saddle and lever 59 at the front of the machine in no wise interferes with oscillation thereby of shaft 52, which is also actuable by lever 63 on the knee. Oscillation of this shaft serves to impart an oscillatory movement to shaft 58, which is transmitted through the vertical spline or teeth 64 and rod 65, shaft 65a, rock arm 66 and control rod 67 through shifter 68 (see Figure 18) for alternately coupling member 69 (see Figure 15) splined on shaft 70 with the terminal member 71 of the feed transmission or rendering effective clutch 72 of terminal member 73 of the rapid traverse for actuating shaft 70 at a rapid pre-adjustable rate. Drive from shaft 70, mounted in the feed box 70a, is taken through beveled gears 74 and 75 and shaft 76 to the control mechanisms for the saddle, table and knee.

Journaled in the knee is a spindle 77 (see Figure 28) actuable by handle 78 and coupled through linkage 79 with shaft 80 having rod lug 81 for oscillation of shaft 82 slidably keyed as at 83 to sleeve 84 rotatably supported by the bed A of the machine. The arrangement is such that the shaft 82 may move up and down with the knee and with respect to the sleeve 84. This sleeve bears a cam 85 coupled by pin 86 with shaft 61 for oscillation thereof. Oscillation of this shaft through lug 60 imparts a vertical or reciprocating movement to member 58 along the side of the column. This reciprocating movement acts through rod 87 to actuate eccentric 88 and clutch control arm 89. When arm 89 is raised from the neutral position shown in Figure 5, it shifts bell crank 90, moving shaft 91 toward the left. This couples clutch member 92 (see Figure 16) on shaft 91 with the driven clutch member 93 having worm gear 94 meshing with driven worm 95 of the hereinafter described feed transmission, whereby power is supplied for automatic shifting of the feed rate control cam.

It will be noted that the connection between bell crank 90 and arm 89 is that of a pin 96 engaged in the slot 97 in the lever, as a result of which downward movement of the lever will not affect member 90, whose return movement is limited by interengagement of pin 98 thereon with abutment cam 99 oscillatable by handle 100 on the rear of the feed box. This handle and cam incidentally form a manual control, when the operator is adjacent the column, for rocking the bell crank to render the feed selector control clutch 92—93, just described, effective. Disposed adjacent and in engagement with another portion of the face of the cam 99 is pin 101 on bell crank shifter mechanism 102 controlling spindle speed selector control clutch 103 on shaft 104. This clutch unit is designed for interlocking engagement with a second clutch unit 105 having gear portion 106 driven from gear 107 coupled to worm gear 108 and worm 109.

*The spindle drive*

The general manner of application of power to the machine and the gearing arrangement, for determining the rate of spindle speed, will be best understood by reference to Figure 7 which is a development of the spindle drive gearing considered in connection with Figure 5 illustrating the several shafts and gears here involved in their actual operative position.

The column "B" is provided with a chamber as at 110 for drive motor 111 coupled by drive chain 112 with the main sprocket 113 keyed on sleeve 114 journaled by suitable antifriction bearings 15 in a bracket on the column "B". This sleeve receives one end of spline shaft 115 provided with discs 117 interfitting with the discs 118 of clutch member 119. The frictional coupling of these parts is controlled by conventional clutch fingers 120 and clutch shifter yoke 121 slidably supported by shaft 116. In this manner shaft 116 may be operatively connected with the drive sleeve 114 for actuation thereof or may be disconnected therefrom without stopping the motor or prime mover 111. Shaft 116 bears the gear couplet 122—123 selectively engageable with gears 124 and 125 of shaft 126 and in addition bears a second couplet 127—128 selectively engageable with gears 129 and 130 of shaft 126.

Disposed adjacent shaft 126 is a second spline shaft 131 having slidable thereon the gear couplet 132 and 133 selectively engageable with gear 129 or pinion member 134 of shaft 126. By this mechanism, by the arrangement of gearing just described, shaft 131 may be operated from the prime mover at any one of 8 selected speeds.

Supported adjacent shaft 131 is a stub shaft 135 and a splined shaft 136. The spline shaft 136 bears a wide face fixed gear 137 while spline shaft 131 has translatably mounted thereon a gear unit 138 which in one position meshes with the left hand portion of the face of gear 137 and in a rearwardly shifted position meshes with reverser pinion 139 carried by shaft 135 and integral with pinion 140 in permanent mesh with gear 137.

It will thus be seen that direct drive from member 138 to gear 137 will cause rotation thereof in a constant given direction while indirect drive of member 137 through pinions 139 and 140 will cause rotation thereof and thus of the supporting shaft 136 in the opposite direction. Shaft 136 forms the final drive transmitting member for the milling machine spindle 141 of standard conventional construction suitably journaled in the upper portion of column "B". This spindle has mounted thereon sleeve 142 having the large gear portion 143 and a lesser diameter gear 144. Shaft 136 bears a translatable unit including a wide face pinion 145 meshable with gear 143 for transmission of maximum power to the spindle at a relatively low rate of speed and the larger gear portion 146 interchangeably meshable with gear 144 for actuating the spindle at a higher rate of speed.

*The spindle speed control mechanism*

Sleeve 114 is provided with a gear portion or ring 147 driving the gear train 148, 149 and 150, which latter serves to supply power to worm 109 for continuous power actuation thereof. This power is adapted to be transmitted through gear 108, pinion 107, clutch 103, shaft 104 and worm gear 151 to worm 152 on shaft 153 of cam 154. This cam (see Figures 8 and 12) is provided with path 155 engaging pin 156 on shifter arm 157, path 158 engaging pin 159 of shifter arm 160 and path 161 engaging pin 162 of shifter arm 163.

Figure 9:
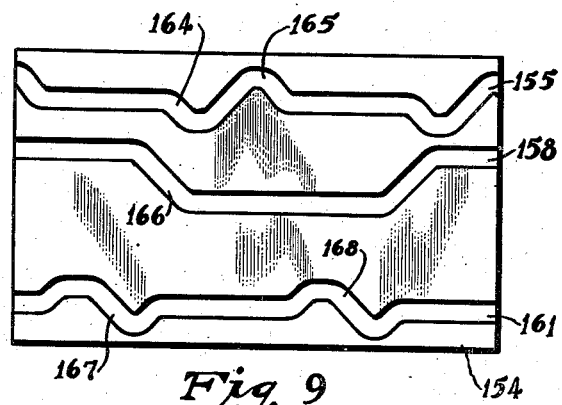
Figure 9 is a development of this cam.

Arm 157 is suitably coupled with gear unit 127 and 128 for translation thereof and arm 163 with unit 122—123 for effecting its translation. Similarly, arm 160 is coupled with the gear unit 132—133. The relationship of the offsets, such as 164, 165, 166, 167 and 168 for example, (see Figure 9) of the several paths 155—158 and 161 is such that as cam 154 is rotated the several sliding gears will be successively moved into and out of engagement with the mating gears to attain in proper progressive order the eight possible speeds of rotation of shaft 131.

In order that the operator may readily determine this speed, selector shaft 104 (see Figure 14) has gear 169 which, through intermediate pinion 170, drives gear 171 for the rotary dial member 172 co-operating with an index pointer or designation as at 173 to denote the particular gear combination enmesh at a given moment and a shifting from one combination to another. If desired, the shifting may be effected entirely by the power actuation and dependence placed on the sensitivity of control of clutch 103 by the operator.

Preferably, however, cam shaft 153 is provided with a star wheel 174 having notches 175 corresponding in number to the several effective positions of the gears. Co-operating with star wheel 174 is a load and fire or positioning detent mechanism, including plunger 176 bearing roller 177 urged against the star wheel by spring 178. The force of this spring is such that when the cam has been sufficiently rotated to cause the roller to ride over one of the points of the star wheel, indicating a partial performance of the shifting of the gears by the cam, if power be disconnected the spring urge of roller 177 is sufficient to continue the movement of the cam and thus the shifting of the gears until same are in proper mesh. Consequently, the operator needs merely to hold in clutch 103 until the dial is approaching the desired speed adjustment, when the clutch may be released and the parts automatically will be continued into proper driving relation at the speed then indicated by the dial.

*Additional spindle speed and direction control*

Figure 11:
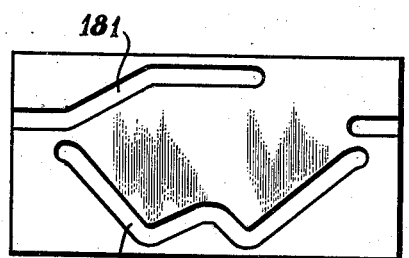
Figure 11 is a development of this cam.

The eight speeds of shaft 131 may be further varied to drive spindle 141 at 16 different speeds and in either a clockwise or a counter-clockwise direction. The variation of direction, as has been previously described, is effected by a translation of unit 138 on shaft 131 while the selection of drive of the spindle at eight relatively slow or eight relatively higher speeds is determined by translation of member 145—146 on shaft 136 in the direction determined by shifting of member 138. These two translatable units are controlled by cam 179 (Figure 12) provided with cam track 180 operatively associated with shift lever 182 for reverser 138 and cam track 181 operatively associated with shift lever 183, for determining the position of unit 145—146. It will be noted, by reference to Figure 11, that cam tracks 180 and 181 are unclosed paths of prescribed amplitude, in place of continuous or endless path form, and this facilitates control of these units by an oscillation of the cam so that the shifting may be made from one side of speeds to the other or for reversal of the spindle without the necessity of passing through the entire series of shifts, as in the case of the main spindle speed controlling cam, although the continuous rotation type cam could be substituted if preferred.

The relation of the cam tracks 180 and 181 are such that each has a neutral position whereby each of the units 138 and 145—146 are in a non-engaging position. A partial rotation of the cam from the neutral position will affect, through cam track 181, a selection of speed, the speed selected depending upon whether the cam is rotated clockwise or counter-clockwise. Simultaneously with this selection of speed, the cam track 180 will effect a given direction but the cam track is such that this given direction will be the same irrespective of which speed is chosen or, in other words, whether the cam is rotated clockwise or counter-clockwise. A further partial rotation of the cam in the same clockwise or counter-clockwise direction as the first partial rotation will effect a change of direction or, in other words, a reversal of direction, but at the same preselected speed.

In the present instance, control of cam 179 has been illustrated as manually effected by handle 184 journaled in the speed box cover 185 and serving of oscillation to rotate bevel gear 186. This gear is in direct mesh with bevel pinion 187 on shaft 188 of cam 179 for effecting desired oscillatory movement of this cam. An index 189 on the handle, co-operating with designations as at 190 on the machine, facilitates visual determination of the effective positioning of the gear units by various shiftings of the handle. Cam 179 is provided with a star wheel portion as at 191 having notches 192 for selective engagement by positioning roller 193 on arm 194 actuated as by spring 195. This, like roller 177, actuates as a combined shifter and detent for completing any movement of the cam initiated by lever 184 and locking the same, and thus the parts controlled by the cam, in desired shifted position.

The feed transmission

The feed transmission proper is particularly illustrated in Figures 15 and 16 of the drawings. It includes a rapid traverse transmission operable at a fixed rate and a sliding gear transmission variably adjustable to obtain at will any one of sixteen selected feeding rates. The primary shaft of this transmission is shaft 196, which is driven by pinion 197 on sleeve 198 which bears worm 109 being driven as previously described by gear 150 and associate gear train from the gear member 147 actuated directly coupled with the main drive sprocket 113 of the machine, as particularly illustrated in Figure 7. Shaft 196 is splined to slidably receive the gear couplet 200—201 and the second couplet 202—203. Disposed adjacent shaft 196 is a second shaft 204 having keyed thereto a gear member 205 for actuation by gear 203. A second gear unit 206 has a portion 207 for alternative engagement by gear 202 of shaft 96 and a portion 208 engageable by gear 209 of sliding unit 210 having a second portion 211 alternatively engageable with pinion 212 of the couplet 213 keyed to shaft 204 and having the large gear 214 for engagement with gear 200 of shaft 196. It will thus be seen that by translation of units 200—201 and 202—203, shaft 204 may be actuated at four different speeds and these may be communicated in turn through unit 210 to drive shaft 215 at eight different selected speeds.

Disposed adjacent shaft 215 is the fourth transmission shaft 216 bearing the sliding couplet 217 comprising a pinion gear 218 for engagement with gear 219 on shaft 215 and the large gear 220 for engagement with pinion 221 on shaft 215, whereby shaft 216 may be variably actuated at sixteen different speeds depending on the relative positioning of the several sliding gear units just referred to.

Secured in the column portion "B" of the machine is a bushing 222 having rotatably mounted thereon a clutch member 71 serving as a support for ring gear 224 normally locked thereto as by the ball safety devices 225 capable of slippage under heavy load, permitting rotation of the ring gear without corresponding movement of the clutch.

Journaled within the bushing 222 is a shaft 70 having on one end a bevel drive pinion 74 and having its opposite end journaled within the sleeve portion 228 of the clutch flange member 229. This shaft has centrally splined thereon the clutch spool 69 provided on one end with clutch teeth 231 for interlocking engagement with the teeth 232 of member 71 and at its opposite end has the internal beveled portion 233 designed to operate clutch fingers 234.

When shifted to the right, as viewed in Figure 15, the member 69 interlocks with member 71 to drive shaft 70 and thus through bevel gear 75 the power shaft 76 for control of saddle, table and knee movement at a selected rate of speed. When shifted in the opposite direction, or to the left, clutch 72 is rendered effective to couple member 73 with the shaft. This member being directly driven through the gear transmission series 235 from gear 150 and that in turn from gear 147 on the main drive sleeve, serves to actuate shaft 76 at a much higher or rapid traverse rate of speed for fast power adjustment of the shiftable work supporting members previously referred to.

Feed transmission control

Power means are provided for rapid automatic sequential shifting of the several translatable sliding gear units, to vary the final feed rate effective through the feed transmission. The drive for this control mechanism is taken from shaft 196 through gears 236 and 237 to shaft 238, to worm 95 and thus through clutch 93—92 and shaft 91 to bevel pinion 239 and intermeshing bevel pinion 240 of cam unit 241 (see Figure 19).

Figure 18:
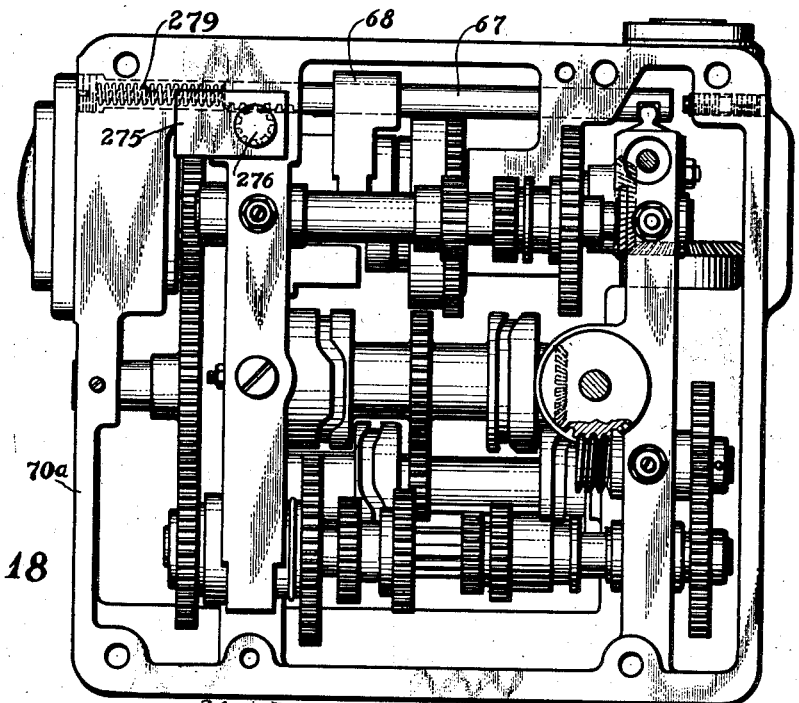
Figure 18 is an elevation as on line 18—18 of Figure 16, showing the interior of the feed change box.
Figure 19:
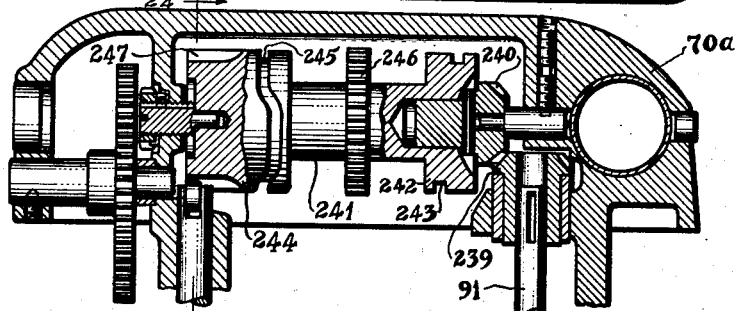
Figure 19 is a detail section illustrating one of the shifter cams and drive therefor.
Figure 20:
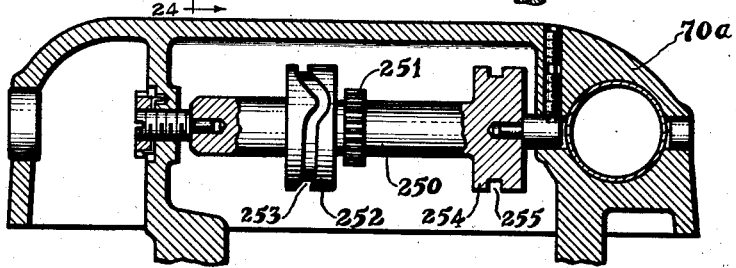
Figure 20 is a similar view of the related intergear cam member.

The general relationship of the control parts will be best understood by reference to Figures 18-20 inclusive, considered in conjunction with the fragmentary detail and sectional views, Figures 21 to 27. Cam member 241 includes a barrel portion 242 having cam track 243, a barrel portion 244 having the cam path 245 and having the intermediate gear 246. The barrel 244 is notched, as at 247, providing a star wheel portion engaged by roller 248 of spring pressed plunger 249, which serves as a combined actuator and detent to aid in completing initiated movement of the cam and to lock the cam and several parts associated therewith in proper adjusted position.

Disposed adjacent cam member 241 is a second cam unit 250 having a pinion 251 meshing with gear 246 for actuation thereby. This unit is suitably supported for free rotation and has the barrel portion 252 with cam track 253 and a second barrel 254 with cam path 255.

Cam path 243 has engaged therein roller 256 on shift lever 257 co-operating with the spool portion 258 of couplet 217 controlling the rate of drive from shaft 215 to 216. The second groove 245 on this main cam unit 241 has engaged therein roller 259 of shift lever 260, which is in turn connected with the spool portion of sliding unit 210 for determination of the rate of drive of shaft 215 over shaft 204. This cam therefore controls the gear unit of the upper half of the sliding gear transmission mechanism shown in development in Figure 15.

The cam path 253 correspondingly receives roller 261 on shift lever 262 controlling the unit 200—201 while path 255 actuates the shift lever 263 for the unit 202—203. By a comparison of Figures 27 and 31, which are developments respectively of the control units 241 and 250, it will be noted that there are a plurality of definite shiftings of the units 200—201 and 202—203 as respects the shiftings of units 210 and 217. By these several relative shiftings in proper sequence, as automatically determined by these cams, the sixteen successive progressive feed changes are effected in their proper sequence depending entirely on the period during which clutch 92—93 is effective for power rotation of shaft 91 and thus of the shifting mechanism.

It will be noted that shaft 91 is provided with a gear 264 serving, through the intermediate gearing 265, to rotate dial 266 carried on the lefthand side of the column and serving to indicate by its rotation the progressive shifting of the gears and the several feed rates as the gears move into mesh. In effecting these movements, the operator manually actuates handle 78 or handle 100, depending on whether he is exercising control from the front of the machine or a point adjacent the column. Either of these handles will serve to rock the shifter arm or bell crank 90, moving shaft 91 to couple clutch 92 and start rotation of the cam control mechanism.

As the dial moves to the selected speed, the handle is released, discontinuing the power actuation of unit 241, when the final movement is completed by the action of the detent plunger 249 both as to the completion of the shifting and locking of the parts in the selected shifted position.

Similarly, it will be understood that a rocking of either the control lever 78 or 100 in the opposite direction will cause an actuation of the member 102 and thus an energization of the power shifting means for determining the rate of spindle rotation.

Machine operation control

For control of the general operation of the machine, use is made of the lever 268 carried by spindle 269 journaled in the column. This spindle has a sleeve providing a rock arm 270 coupled by link 271 with shifter yoke 272 engaged with clutch spool 121. Depression of this lever shifts the spool, to throw out clutch 119 and stop the drive of shaft 116 and thus the application of power to the spindle. Reverse shifting causes engagement of the clutch when the parts are held in operative relation, as by spring pressed detent 273. As link 271 is shifted, by depressing lever 268, pin 274 thereon engages arm 275 of rock shaft 276 having pinion 277 in engagement with rack 278 on rod 67. This shifts the rod to the left, as viewed in Figure 18, compressing spring 279 and moving shifter 68 and member 69 to disconnect the feed clutch 71—231. These parts are therefore held in inoperative position, preventing power actuation of the feed drive when the spindle is stopped. This, however, in no wise interferes with a further shifting of member 68 in the event that it is desired to employ the continuously running power rapid traverse. When lever 268 is raised, to render clutch 119 effective, spring 279 expands, re-engaging the feed clutch. It will be understood that on account of the coupling of member 67 with the hand control 50, for selective engagement of feed or rapid traverse, that this lever is also thrown into neutral position when the lever 268 is depressed. The contact between pin 274 and rock arm 275, however, in no wise interferes with actuation of member 67 through handle 50, for coupling of the quick traverse drive as desired.

In addition, it will be apparent from the construction of the machine that the operation of the clutch 119 in no wise affects the drive to the feed speed transmission and the power gear shifting control mechanisms for the spindle speed and feed speed transmissions, these being in constant rotation as long as the prime mover is actuated. This results in having the power shifting mechanisms always available whether the cutter and table are moving or not, and also provides for quick and easy intermeshing of the gears of the feed transmission when rate shifts are made by the sliding gears. This adds to the facility and speed of operation of the machine.

The provision of means on the lever 271, to disconnect the feed drive to the saddle, table and knee when the spindle is stopped and also to prevent reconnection until the spindle is started, operates as a safety device, in that it makes it impossible for the operator to throw in the feed for the work table, for instance, until the cutter spindle and its cutter are rotating, thus insuring that the cutter will be rotating when the work is fed into it.

Control of translatable units

Figure 36:
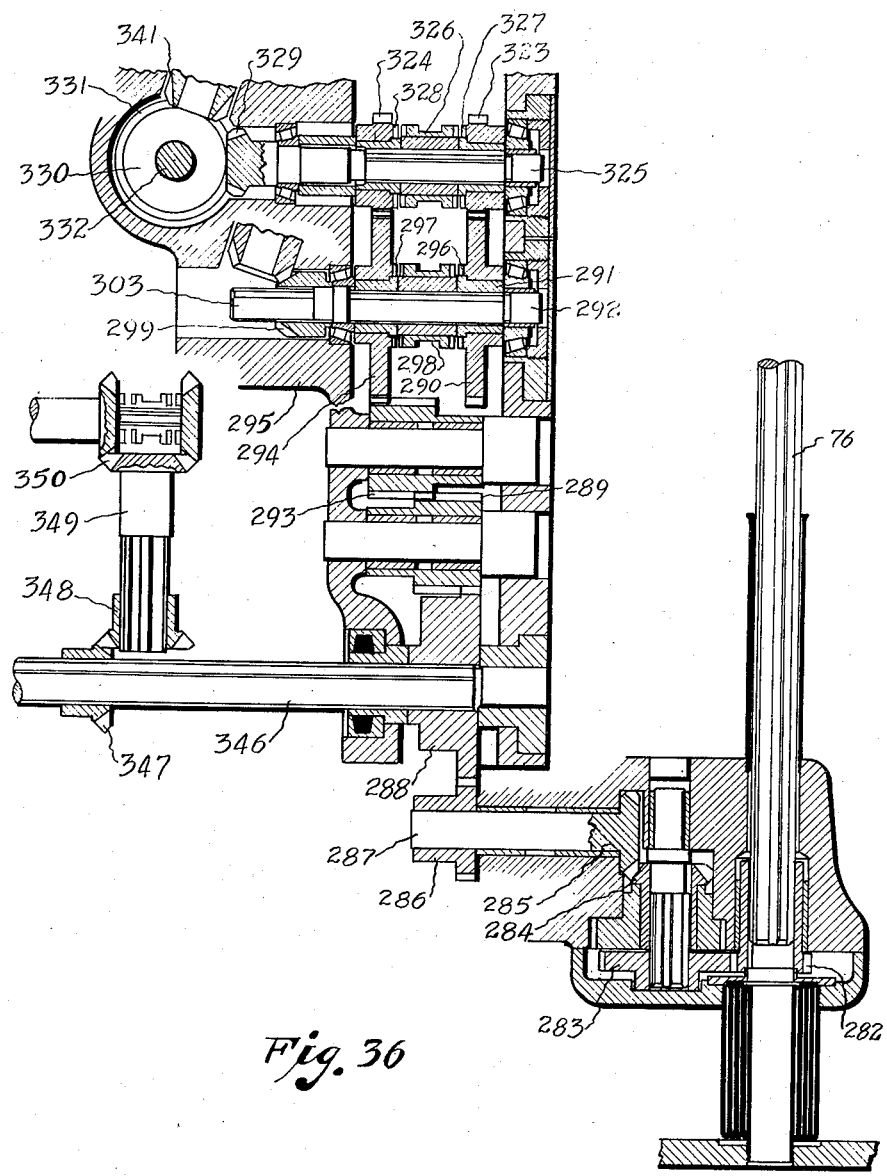
Figure 36 is a development of the several power transmissions for effecting movement of the translatable units of the machine.

In the performance of various milling operations, the two prime essentials are a cutter such as 281 and a work support such as the table F. Various types of work require a relative movement between said parts which may be either a movement of one toward the other for either vertical or horizontal milling, when an arcuate key slot is to be produced for example, a transverse or feeding movement when a grooved or a transverse surface is to be milled or a relative in and out movement as when different portions of selected width are to be traversed by the same cutter or when form milling or the like is to be performed. This result is attainable in various types of milling machines by interposition of a plurality of translatable units or supporting members between the cutter and the work support, so that the movements are effected either by a shifting of the cutter spindle, a shifting of the work, or both. In the present instance, for purposes of illustration of the general principles of the invention, the machine has been shown as comprising a bed A having the column B, on which is slidable a knee D for vertical movement supporting a saddle E for transverse or in and out movement and a table or work support F movable at right angles to the saddle for feeding movement of the work, but it is to be understood that the other forms just referred to are clear equivalent constructions to which the invention is equally applicable. The movement of these parts may be effected by control power transmission trains driven by the prime mover or alternatively by a manual adjustment thereof. The mechanisms involved, in attaining these adjustments and tooling shifts, is particularly illustrated in Figures 37 to 41 inclusive. By reference to Figure 36, which is a development of the gearing transmissions involved, it will be noted that spline shaft 76 has slidable thereon pinion 282 meshing with gear 283 driving the beveled gears 284—285 transmitting power to spur gear 286 on shaft 287. Spur gear 286, in turn drives gear 288 meshing with the wide face gear 289 directly driving the transmission gear 290 rotating on bushing 291 surrounding spline shaft 292. The wide face gear 289 also drives reverser pinion 293 meshing with gear 294 rotatable on bushing 295, also surrounding shaft 292. Gears 290 and 294 are thus concentrically located but driven in opposite directions. They have respectively the clutch faces 296 and 297 selectively engageable by clutch 298 having opposite clutch faces, when moved from its intermediate neutral position. Shaft 292 bears the beveled pinion 299 manually actuable by meshing pinion 299 on shaft 301 which projects diagonally toward the rear of the machine and is adapted to receive actuating handle 302. Keyed or splined within pinion 299 is the feed screw 303 operating in nut 304 carried by the saddle E. Consequently, rotation of the pinion by handle 302 or drive power actuation thereof through gear 290 or 294 and clutch 298 will serve to impart desired in or out transverse movement of the saddle on the knee. In addition, the screw has an extended terminal portion 305 projecting at the front of the machine and bearing the manually actuable wheel 306. The screw may therefore be controlled and manually rotated from an operating position at the front side or edge of the table or from an operating position or station at the rear edge or column sides of the table. In general, shifter yoke 307 engages the clutch member 298. This shifter is carried by a sliding rod 308 having a groove therein at 309, 310 and 311. Groove 309 receives a rib 312 on rod 313 actuable through beveled gears 314 and 315 and handle 316, which is disposed on the knee in a position accessible from the rear of the table. Groove 311 receives a similar rib 317 on rod 318 actuable by handle 319 at the front of the table. Groove 310 receives rib 320 of rod 321 actuable by a dog controlled plunger 322 for controlling the feeding movement of the saddle in either direction.

It will be understood that oscillation of either rod 313 or 318, by its respective handle, or rod 321 by the plunger aforesaid will impart a longitudinal sliding movement to rod 308 and its associated shifter. The position of the handles is such that an oscillation of either, in the direction of the column, will cause a corresponding movement of the saddle, while an oscillation in the opposite direction will cause an outward movement of the saddle with respect to the column, so that directional control of the said translatable unit may be effected from either the front or the rear of the table.

The knee

Meshing with gear 290 is a pinion 323, while meshing with gear 294 is a pinion 324, the two being suitably supported on bushings surrounding spline shaft 325, which bears the intermediate clutch member 326 selectively engageable with clutch face 327 of gear 323 or 328 of gear 324. This spline shaft is provided with a bevel pinion 329 engaging the beveled gear 331 on nut 330 carried by the knee and circumscribing the knee adjusting screw 332. By shifting of the clutch, power vertical adjustment of knee D may be effected through this transmission. The clutch member 326 is controlled by yoke 333 on shift rod 334 movable through connection 335, rod 336 and handle 337 at the front of the machine or correspondingly longitudinally shiftable through connection 338, rod 339 and handle 340 at the rear, all as particularly illustrated in Figure 38. The handles 337 and 340 normally occupy horizontal positions so that when either is depressed it will shift the clutch, to cause a downward movement of the knee and, similarly, when raised will cause a power actuated upward movement thereof. Gear 331, in addition, has meshing therewith pinion 341 on rod 342 terminating at the front of the machine by a manually actuable handle 343. A second pinion 344, meshing with gear 331 has an operating rod 345 extending diagonally toward the rear of the machine for suitable manual actuation at that point. In use, handle 302 is normally interchangeably fitted on one or the other of rods 301 and 345, thus eliminating the presence of interfering handles and compacting the operating space. It will be understood, however, that special non-interfering handles or actuating members may be permanently associated with each of members 301 and 345 if preferred.

The drive for translation of the table is effected through spline shaft 346, which supports and is driven by gear 288 and has slidable thereon beveled pinion 347 meshing with pinion 348 on vertical shaft 349 terminating in a beveled gear 350. This gear, for ease of understanding, has been shown in distorted position in Figure 40, as distinguished from its actual position indicated in Figure 36. Overlying the shaft 349 and gear 350 is the table lead screw 351, non-translatably secured, as at 352, in a depending portion 353 of the table F. This screw extends through the nut 354 carried by saddle E. Rotation of the screw in the nut 354 will therefore cause its longitudinal movement, shifting with the table unit. This rotation is effected through a spline sleeve 355 having in turn splined thereon clutch 356 selectively engageable with the inner clutch faces of beveled gears 357 or 358, loosely rotatable on spline sleeve 355 and in driving engagement with beveled gear 350. This mechanism is such that gears are driven in opposite directions so that shifting of the clutch member from its neutral position to the right or left will respectively cause a righthand or lefthand movement of the table. This shifting is effected by yoke 359 on rod 360 terminally notched as at 361 to engage the head of rock lever 362 actuable by handle 363. In addition, a second rock lever 364 has a shifter head engaged in notch 365 of the rod and is connected by link 366 with actuating handle 367 at the front of the machine. In this instance, also, we have manually controlled members for the power translation of the unit located respectively for effecting these movements from operating stations at the front and at the rear of the machine so that any selected power actuation of the several translatable units such as knee, saddle and table may be directionally attained by a corresponding directional shifting of a control member when the operator is at either operating station as respects the machine. In addition, the table screw is provided with a hand operating member as at 368, which is accesible from either station.

Supplementing these control members, attention is invited to the fact that the co-operating levers 50' and 63, respectively, at the front and rear stations, facilitate control from either of these positions of the coupling of feed or rapid traverse to the transmission shaft at the side of the column for transmission of the one or the other of these rods to the several translatable units, while the levers 78 and 100, available at the respective stations, permit selective power shifting or variance of the variable speed transmission to the spindle or the variable speed transmission of feeding drive to the translatable parts from the operating stations at the front and at the rear of the machine.

Further attention is invited to the fact that a most compact and efficient mechanism has been provided, in that the single member 58, by different actuations thereof, serves a three-fold purpose, in that one actuation effects the power shifting mechanism for selection of the rate of rotation of the tool support or spindle, a second selective actuation thereof renders effective the power means for determining the rate of rotation to be imparted to a selected rotatable screw or nut for effecting translation of a desired part, while a third selected movement of the member 58 serves to determine whether the rate of rotation of the translation effecting member shall be a rapid traverse rate or shall be a variable feed rate, as previously determined by the selection of a particular sliding gear transmission coupling effected by a different movement of the same control member 58. This single member 58 is therefore the determinator of rate of rotation of the tool, rate of feeding rotation of a translation effecting member or, alternatively, of a high speed quick traverse rotation of the member and therefore, in its selected actuation, governs the entire operation of the machine.

We claim:

1. A milling machine including a tool spindle, a work table for presentation of work in opposition to the spindle, means supporting said parts for relative adjustment one toward the other and for relative feeding movement one with respect to the other, power means for rotating the spindle, power means for effecting said relative feeding movement, variable speed transmissions included in said respective power means for varying the feed and rotation of the parts, branch transmission means actuable by the power means for determining the operative effect of the variable speed transmissions and a single control device available at an operating position on the opposite side of the table from the transmissions for selectively effecting the desired rate variation of either of said variable speed transmissions.

2. A milling machine including a tool spindle, a work table for presentation of work in opposition to the spindle, means supporting said parts for relative adjustment one toward the other and for relative feeding movement one with respect to the other, power means for rotating the spindle, power means for effecting said relative feeding movement, variable speed transmissions included in said respective power means for varying the feed and rotation of the parts, branch transmission means actuable by the power means for determining the operative effect of the variable speed transmissions, a single control device available at an operating position on the opposite side of the table from the transmissions for selectively effecting the desired rate variation of either of said variable speed transmissions, and additionally, alternatively actuable means adjacent the transmissions for similarly determining their operative coupling.

3. The combination with a milling machine including a column, of a rotatable tool spindle and a work support mounted thereon for movement one with respect to the other, a rotatable member for effecting such relative movement, a prime mover, a variable speed transmission coupling the prime mover with one of said two rotatable parts, a branch transmission coupled with the prime mover, means operable by the branch transmission for determining the rate of rotation of the member driven by the variable speed transmission, a control device carried by the relatively movable member, and operative connections between the control device and the branch transmission whereby the control device is effective to determine the rate of drive of the rotatable member.

4. The combination with a milling machine including a column, of a rotatable tool spindle and a work support mounted thereon for movement one with respect to the other, a rotatable member for effecting such relative movement, a prime mover, a variable speed transmission coupling the prime mover with one of said two rotatable parts, a branch transmission coupled with the prime mover, means operable by the branch transmission for determining the rate of rotation of the member driven by the variable speed transmission, a control device carried by the relatively movable member, operative connections between the control device and the branch transmission whereby the control device is effective to determine the rate of drive of the rotatable member, and a second control device nontranslatably supported adjacent the branch transmission and remote from the first control device for alternatively determining the operative effect thereof.

5. A milling machine including a bed, a tool spindle support carried by the bed having a spindle journaled therein, a work support carried by the bed, and shiftable relative to the spindle, a prime mover, a power transmission including variable speed gearing operatively connecting the prime mover and spindle, means for effecting power movement of the work support including a second variable speed transmission power means for varying the rate transmitted by one of said variable speed transmissions, and a control device on the shiftable member and coupled with said power means for controlling the operation thereof.

6. A milling machine including a bed, a tool spindle support carried by the bed having a tool spindle journaled therein, a work support carried by the bed and shiftable relative to the spindle, a prime mover, a power transmission including variable speed gearing operatively connecting the prime mover and spindle, means for effecting power movement of the work support including a second variable speed transmission power means for varying the rate transmitted by each of said variable speed transmissions, a control device on the shiftable member and coupled with said power means for varying the rate transmitted by each of said variable speed transmissions and a control device carried by the shiftable member remote from the transmissions and selectively actuable to determine the operative effect of the power means on either of the transmissions.

7. A milling machine including a column, a cutter spindle and a work support mounted on the column, a prime mover carried thereby, variable speed connections between the prime mover and the spindle for rotation of the spindle, additional variable speed connections from the prime mover for effecting a relative shifting of the spindle and work support one with respect to the other, clutch means for determining the operative connection of the feed mechanism and the spindle rotating mechanism, a single control for jointly determining the operative effect of the clutch mechanism, an independent quick traverse drive transmission in constant operative connection with the prime mover and means for coupling the quick traverse with the shiftable member when the control member has rendered the other drive connections ineffective.

8. A milling machine including a column, a cutter spindle and a work support mounted on the column, a prime mover carried in the column, variable speed connections between the prime mover and the spindle for rotation of the spindle, additional variable speed connections from the prime mover for effecting a relative shifting of the spindle and work support one with respect to the other, clutch means for determining the operative connection of the feed mechanism and the spindle rotating mechanism, a single control for jointly determining the operative effect of the clutch mechanism, independent quick traverse drive transmission in constant operative connection with the prime mover and means for coupling the quick traverse with the shiftable member when the control member has rendered the other drive connections ineffective, power means for effecting speed variation of the spindle and feed drive mechanisms, and driving connections between said power means and the quick traverse transmission whereby said power means is constantly driven and available.

9. A milling machine including a column, a cutter spindle rotatably supported thereby, a work support supported by the column, feeding means for imparting relative movement to the work support with respect to the spindle, a prime mover, a transmission from the prime mover to the spindle including a clutch and an organized speed variator disposed in serial relation in the transmission, a second transmission deriving power from the first transmission line at a point intermediate the prime mover and clutch whereby said second transmission is unaffected by the clutch, a first branch transmission extending from the second transmission to the feeding means, a second branch transmission extending to the feeding means and including an organized variable speed unit, clutch means alternatively available to couple the first or second branch transmission to the feeding means, a single actuator for simultaneously shifting the spindle drive clutch and second branch transmission clutch in the inoperative position and additional means for shifting the first branch transmission clutch for operative coupling of the first branch transmission and feeding means when the second branch transmission is disconnected therefrom.

10. In a machine tool, the combination with a prime mover, of a pair of organized variable speed transmission units actuable thereby, additional power actuable means for determining the operative coupling of each of said variable speed units with a part to be actuated thereby, a control device for each of the power actuated means and a plurality of operating members disposed at remotely situated points on the machine tool, said members having independent connections with the control device for selective actuation thereof from different operating positions of the tool.

11. A milling machine including a support and a plurality of rotatable parts carried thereby including a cutter spindle and a power feed device, a prime mover, transmissions extending from the prime mover to said rotatable members and including organized speed varying transmission units, separate supplemental power driven means for individually determining the operative effect of each of said variable speed transmission units, selectors for determining the actuation of each individual power control device, and a manually operable member selectively shiftable to actuate a desired selector.

12. A milling machine including a support and a plurality of rotatable parts carried thereby including a cutter spindle and a power feed device, a prime mover, transmissions extending from the prime mover to said rotatable members and including organized speed varying transmission units, supplemental power driven means for individually determining the operative effect of each of said variable speed transmission units, selectors for determining the actuation of an individual power control device, and a plurality of remotely situated manually operable actuators having independent connections with the selectors whereby an individual actuator may be selectively shifted to cause a power rate variation of a selected transmission.

13. A milling machine including a support and a plurality of rotatable parts carried thereby including a cutter spindle and a power feed device, a prime mover, transmissions extending from the prime mover to said rotatable members and including organized speed varying transmission units, supplemental power driven means for individually determining the operative effect of each of said variable speed transmission units, selectors for determining the actuation of an individual power control device, and a plurality of remotely situated manually operable actuators each having independent lost motion connections with the selectors whereby the several actuators are available at different operating positions on the machine and can be individually shifted to effect rate variation of a desired unit without disturbance of the other actuators.

14. A milling machine including a support and a plurality of rotatable parts carried thereby including a cutter spindle and a power feed device, a prime mover, transmissions extending from the prime mover to said rotatable members and including organized speed varying transmission units, supplemental power driven means for individually determining the operative effect of each of said variable speed transmission units, selectors for determining the actuation of an individual power control device, having independent connection with the selectors whereby either may be shifted to operate a desired selector and means for preventing simultaneous engagement of different selectors by different actuators.

15. A machine tool organization including a bed, a part supported for translation relative to the bed, a rotatable tool support disposed in co-operative relation to the translatable support, a prime mover, a variable speed transmission extending from the prime mover to the rotatable tool support for effecting rotation thereof, a second variable speed transmission coupled with the prime mover for effecting translation of the part, and power actuable means for determining the effective coupling of one of said transmissions.

16. A machine tool organization including a bed, a part supported for translation relative to the bed, a rotatable tool support disposed in co-operative relation to the translatable support, a prime mover, a variable speed transmission extending from the prime mover to the rotatable tool support for effecting rotation thereof, a second variable speed transmission coupled with the prime mover for effecting translation of the part, power actuable means for determining the effective coupling of one of said transmissions, and additional independently operable power actuable means for determining the effective coupling of the other of said transmissions.

17. A machine tool organization including a bed, a part supported for translation relative to the bed, a rotatable tool support disposed in co-operative relation to the translatable support, a prime mover, a variable speed transmission extending from the prime mover to the rotatable tool support for effecting rotation thereof, a second variable speed transmission coupled with the prime mover for effecting translation of the part, power actuable means for determining the effective coupling of one of said transmissions, additional independently operable power actuable means for determining the effective coupling of the other of said transmissions, and a single lever selectively shiftable to control the energization of one or the other of said power actuable means.

18. A machine tool transmission including a prime mover, a variable speed transmission and a final member for rotation thereby, a first series of selector cams operative upon the variable speed transmission for effecting a progressive series of rotational rates in said transmission, a second series of selector cams operative upon the said transmission to effect a change of direction and additional changes of rotational rates, means for power operating said first series of cams, and manual means for actuation of the second series of cams.

19. A machine tool transmission including a prime mover, a variable speed transmission and a final member for rotation thereby, a rotatable unitary cam structure having means to operate a gear couplet forming part of said transmission to effect a change of rate therein, said cam also having means to operate a reverser in said transmission to effect a change of direction therein, each of said means being operated by the cam in such sequence that upon partial rotation of the cam in a given direction, a selection of speed is made and in a given direction and upon a further partial rotation of the cam a change of direction is effected but at the preselected speed.

20. A machine tool transmission including a prime mover, a variable speed transmission and a final member for rotation thereby, a series of selector cams operative upon the variable speed transmission for selectively effecting different rates of rotation in the final member, a rotatable dial coupled with the cams for indicating in progressive succession the rates of rotation as effected, and means for coupling the cams and dial with the prime mover for power actuation thereof.

21. In a milling machine having a column, a cutter spindle and prime mover, mounted therein, a variable speed transmission extending from the prime mover to the cutter spindle including a main shaft, clutch means for operatively connecting the main shaft with the prime mover, said main shaft carrying two pairs of shiftable gear couplets, a second shaft carrying a shiftable gear couplet, an intermediate shaft having fixed gears for intermeshing with the shiftable gear couplets to effect different rates of rotation in the second shaft, said second shaft also carrying a shiftable gear for driving a third shaft mounted in the column in a forward or reverse direction, said third shaft having a pair of shiftable back gears for actuation of the cutter spindle.

22. In a milling machine having a column, a cutter spindle and prime mover, mounted therein, a variable speed transmission extending from the prime mover to the cutter spindle including a main shaft, clutch means for operatively connecting the main shaft with the prime mover, said main shaft carrying two pairs of shiftable gear couplets, a second shaft carrying a shiftable gear couplet, an intermediate shaft having fixed gears for intermeshing with the shiftable gear couplets to effect different rates of rotation in the second shaft, said second shaft also carrying a shiftable gear for driving a third shaft mounted in the column in a forward or reverse direction, said third shaft having a pair of shiftable back gears for actuation of the cutter spindle, and means for individually actuating the several gear couplets, the shiftable gear and the shiftable back gears in a predetermined sequence to effect a series of speed rates in the cutter spindle.

23. In a milling machine having a column, a cutter spindle and prime mover mounted therein, a variable speed transmission extending from the prime mover to the cutter spindle including a main shaft, clutch means for operatively connecting the main shaft with the prime mover, said main shaft carrying two pairs of shiftable gear couplets, a second shaft carrying a shiftable gear couplet, an intermediate shaft having fixed gears for intermeshing with the shiftable gear couplets to effect different rates of rotation in the second shaft, said second shaft also carrying a shiftable gear for driving a third shaft mounted in the column in a forward or reverse direction, said third shaft having a pair of shiftable back gears for actuation of the cutter spindle, power means for shifting the several gear couplets, cam means for controlling the shiftable gear and shiftable back gears, and a manual lever for operating the cam means.

24. In a milling machine having a column, a cutter spindle and prime mover mounted therein, a variable speed transmission extending from the prime mover to the cutter spindle including a main shaft, clutch means for operatively connecting the main shaft with the prime mover, said main shaft carrying two pairs of shiftable gear couplets, a second shaft carrying a shiftable gear couplet, an intermediate shaft having fixed gears for intermeshing with the shiftable gear couplets to effect different rates of rotation in the second shaft, said second shaft also carrying a shiftable gear for driving a third shaft mounted in the column in a forward or reverse direction, said third shaft having a pair of shiftable back gears for actuation of the cutter spindle, power means for jointly actuating the several gear couplets, and manual means for individually actuating the shiftable gear and shiftable back gears.

25. In a milling machine having a moving part and a prime mover, a plurality of transmissions operated by the prime mover and terminating in a rapid traverse element and a feed element, clutch means for engaging either of said elements to operate the moving part, a spindle transmission having a clutch for operatively coupling it to the prime mover, individual control means for each of the clutches, and interlocking means between the control means to prevent engagement of the first clutch with the feed element when the second clutch is disconnected while permitting engagement with the rapid traverse element.

26. In a milling machine having a column, a rotatable tool support mounted in the column, a work support adjustably mounted on the column, a power source, a variable spindle speed transmission and a variable feed transmission mounted in the column and both adapted to be driven from the power source, separate power operated gear shifting means for each of the transmissions to effect rate changes therein, individual clutches for coupling each of the power shifting means with the power source, and a single control lever for actuation of the clutches.

27. In a milling machine having a column, a saddle, table and knee supported upon the column, a spindle journaled in the column, a power source, a variable spindle speed transmission and a variable feed transmission mounted in the column and adapted to be driven from the power source, separate power operated gear shifting means for each transmission to effect rate changes therein, individual clutches for coupling each of the shifting means with the power source, bell cranks for operating each of the clutches, and a single lever having lost motion connections with each of the bell cranks whereby only one clutch can be operated at a time, and manual means on the knee for operating the lever.

28. In a milling machine having a column, a saddle, table and knee supported upon the column, a power source, a variable spindle speed transmission and a variable feed transmission mounted in the column and adapted to be driven from the power source, separate power operated gear shifting means for each transmission to effect rate changes therein, individual clutches for coupling each of the shifting means with the power source, bell cranks for operating each of the clutches, and a rotatable cam for operating the bell cranks but effective to operate only one at a time, and manual means for rotating the cam.

29. A milling machine having a column, a prime mover mounted therein, a transmission for a saddle, table and knee movably mounted on the column consisting of a variable feed mechanism and a rapid traverse mechanism mounted in the column and actuated by the prime mover, said mechanisms terminating respectively in a feed element and a rapid traverse element, a vertical shaft rotatably mounted in the column, clutch means for actuating the shaft from either the feed element or the rapid traverse element, a gear train mounted in the knee and actuated by a gear mounted in the knee and having a splined connection with the vertical shaft, said gear train driving three branch transmissions respectively to the saddle, table and knee.

30. In a milling machine having a variable spindle speed and a variable work feed transmission, power operated rate varying means for each transmission and a rapid traverse transmission, a master controller for these elements, means for actuating the controller in one plane for determining the operative effect of the feed or rapid traverse transmission, and means for actuating the controller in a different plane for selectively coupling either rate varying means with a source of power.

31. In a milling machine having a fixed part and a movable part, variable spindle speed and work feed transmissions, power operated rate varying means for each transmission, and a rapid traverse transmission mounted in the fixed part, a master control rod mounted on the fixed part, separate means carried with the movable part and having operative connections with the master control rod for actuating the same in different planes, actuation in one plane determining the operative effect of the feed or rapid traverse transmission, and actuation in another plane selectively determining the power coupling of the rate varying means.

32. A milling machine including a tool holding member rotatable at selectively variable speeds and a work carrying member, a plurality of oscillatable supports intermediate said members for effecting relative vertical transverse and traversing movement of the tool and work support, a prime mover, transmission means connecting the prime mover and supports for power actuation thereof, a transmission extending from the prime mover to the tool for rotation thereof, organized speed varying mechanism in said transmissions, means determining operating stations for manipulation of the machine, duplicate controls at each of said stations for determining the rate of movement of the tool and of the several translatable units, and additional duplicate means at said stations for determining the directional actuation of individual translatable units whereby the operation of the machine may be completely controlled from any operating station.

33. A machine of the character described including a tool holder and a work support, a prime mover, variable speed transmissions connecting the prime mover and tool holder and the prime mover and work support, a single control member selectively actuable to vary the operative effect of either of said transmissions, a supplemental quick traverse transmission coupling the prime mover and one of the two first named parts, and operative connections between said quick traverse transmission and the single control member for determining the effective coupling of the quick traverse transmission with the part to be actuated thereby.

34. A machine of the character described including a tool holder and a work support, a prime mover, variable speed transmissions connecting the prime mover and tool holder and the prime mover and work support, a single control member selectively actuable to vary the operative effect of either of said transmissions, a supplemental quick traverse transmission coupling the prime mover and one of the two first named parts, operative connections between said quick traverse transmission and the single control member for determining the effective coupling of the quick traverse transmission with the part to be actuated thereby, actuators remotely disposed one as respects the other, and connections between each of said actuators and said single control member for operation thereof.

35. A milling machine including a work table and a tool support, a plurality of relatively translatable units intervening between the table and tool support whereby said parts may be given vertical, lateral and transverse adjustments one with respect to the other, a prime mover, a variable speed branch transmission extending from the prime mover to the tool support for selective variable speed actuation thereof, a second variable speed transmission, branch transmissions extending from the second variable speed transmission to each of the translatable units for power actuation thereof, a reverser clutch in each of said last mentioned transmissions, a series of directionally actuable control members available from an operating position at the side of the table remote from the tool support for determining the coupling of the individual clutches for power actuation of the individual translatable units in a selected direction, and a second series of directionally actuable control members available from an operating position at the side of the table proximate the tool support for alternatively shifting the clutches to determine the directional translatory movement of the units.

36. A milling machine including a work table and tool support, a plurality of relatively translatable units intervening between the table and tool support whereby said parts may be given vertical, lateral and transverse adjustments one with respect to the other, a prime mover, a variable speed branch transmission extending from the prime mover to the tool support for selective variable speed actuation thereof, a second variable speed transmission, branch transmissions extending from the second variable speed transmission to each of the translatable units for power actuation thereof, a reverser clutch in each of said last mentioned transmissions, a series of directionally actuable control members available from an operating position at the side of the table remote from the tool support for determining the coupling of the individual clutches for power actuation of the individual translatable units in a selected direction, a second series of directionally actuable control members available from an operating position at the side of the table proximate the tool support for alternatively shifting the clutches to determine the directional translatory movement of the units, power means for determining the speed adjustment of each of the variable speed transmissions, and control means available at opposite sides of the table for controlling said power speed variation.

37. A milling machine including a work table and tool support, a plurality of relatively translatable units intervening between the table and tool support whereby said parts may be given vertical, lateral and transverse adjustments one with respect to the other, a prime mover, a variable speed branch transmission extending from the prime mover to the tool support for selective variable speed actuation thereof, a second variable speed transmission, branch transmissions extending from the second variable speed transmission to each of the translatable units for power actuation thereof, a reverser clutch in each of said last mentioned transmissions, a series of directionally actuable control members available from an operating position at the side of the table remote from the tool support for determining the coupling of the individual clutches for power actuation of the individual translatable units in a selected direction, a second series of directionally actuable control members available from an operating position at the side of the table proximate the tool support for alternatively shifting the clutches to determine the directional translatory movement of the units, power means for determining the speed adjustment of each of the variable speed transmissions, and control means available at opposite sides of the table for controlling said power speed variation, said means comprising a single actuator at each station selectively actuable to effect a desired speed variation of either branch transmission.

38. A milling machine including a work table and a tool support, a plurality of relatively translatable units intervening between the table and tool support whereby said parts may be given vertical, lateral and transverse adjustments one with respect to the other, a prime mover, a variable speed branch transmission extending from the prime mover to the tool support for selective variable speed actuation thereof, a second variable speed transmission, branch transmissions extending from the second variable speed transmission to each of the translatable units for power actuation thereof, a reverser clutch in each of said last mentioned transmissions, a series of directionally actuable control members available from an operating position at the side of the table remote from the tool support for determining the coupling of the individual clutches for power actuation of the individual translatable units in a selected direction, a second series of directionally actuable control members available from an operating position at the side of the table proximate the tool support for alternatively shifting the clutches to determine the directional translatory movement of the units, a third quick transverse transmission actuated by the prime mover and alternatively coupled with the branch transmissions to the translatable units, and control members operable from distant or proximate sides of the table for selectively determining the coupling of the variable speed or quick traverse transmissions with the translatable units.

39. A milling machine including a support and a plurality of units mounted for translation relative the support including a work table, a variable speed transmission disposed within the support, an alternately available quick traverse transmission within the support, a prime mover for actuation of said transmissions, a final drive shaft carried by the support, means for selectively coupling the variable speed or quick traverse transmission with the drive shaft, a plurality of branch transmissions carried by one of the translatable units, a splined drive connection between the shaft and said transmission, and individual directionally actuable clutches for selectively coupling the several translatable units with their respective drive transmissions for determining the direction of actuation thereof at a feed or quick traverse rate, as determined by the selector of the shaft drive.

40. A milling machine including a support and a plurality of units mounted for translation relative the support including a work table, a variable speed transmission disposed within the support, an alternately available quick traverse transmission within the support, a prime mover for actuation of said transmissions, a final drive shaft carried by the support, means for selectively coupling the variable speed or quick traverse transmission with the drive shaft, a plurality of branch transmissions carried by one of the translatable units, a splined drive connection between the shaft and said transmissions, individual directionally actuable clutches for selectively coupling the several translatable units with their respective drive transmissions for determining the direction of actuation thereof at a feed or quick traverse rate as determined by the selector of the shaft drive, a series of control members for the selector and clutches available from an operating position at one side of the table for determining the operative coupling of the selector and of each of the clutches, and a duplicate set of controls for each of said parts available for operation from a working station at the opposite side of the table whereby the movement of the parts may be completely manually controlled by an operator at either working station.

41. A milling machine including a support and a plurality of units mounted for translation relative the support including a work table, a variable speed transmission disposed within the support, an alternately available quick traverse transmission within the support, a prime mover for actuation of said transmissions, a final drive shaft carried by the support, means for selectively coupling the variable speed or quick traverse transmission with the drive shaft, a plurality of branch transmissions carried by one of the translatable units, a splined drive connection between the shaft and said transmissions, individual directionally actuable clutches for selectively coupling the several translatable units with their respective drive transmissions for determining the direction of actuation thereof at a feed or quick traverse rate as determined by the selector of the shaft drive, a series of control members for the selector and clutches available from an operating position at one side of the table for determining the operative coupling of the selector and of each of the clutches, a duplicate set of controls for each of said parts available for operation from a working station at the opposite side of the table, power shift mechanism coupled with the variable speed transmission to the translatable units for power selection of the speed transmission thereby, and independent control means available at each station for determining the operation of said power speed variator whereby the movement of the parts may be completely manually controlled by an operator at either working station.

42. A milling machine including a support and a plurality of units mounted for translation relative the support including a work table, a variable speed transmission disposed within the support, an alternately available quick traverse transmission within the support, a prime mover for actuation of said transmissions, a final drive shaft carried by the support, means for selectively coupling the variable speed or quick traverse transmission with the drive shaft, a plurality of branch transmissions carried by one of the translatable units, a splined drive connection between the shaft and said transmissions, individual directionally actuable clutches for selectively coupling the several translatable units with their respective drive transmissions for determining the direction of actuation thereof at a feed or quick traverse rate as determined by the selector of the shaft drive, a series of control members for the selector and clutches available from an operating position at one side of the table for determining the operative coupling of the selector and of each of the clutches, a duplicate set of controls for each of said parts available for operation from a working station at the opposite side of the table, and power shift mechanism coupled with the variable speed transmission to the translatable units whereby the movement of the parts may be completely manually controlled by an operator at either working station.

43. A machine tool transmission including a prime mover and a final member to be rotated thereby, shiftable units for determining the rate of actuation of the final member by the prime mover, a branch transmission, means operable thereby for shifting said units in predetermined order to effect a geometrical progression of speed rates in the final member, means for manually controlling the effective actuation of the branch transmission, and means to indicate the particular rate of the progression effected.

44. A machine tool transmission including a prime mover and a final member to be actuated thereby, an organized intervening speed variator for determining the rate of actuation of the final member by the prime mover, said variator being organized to produce a series of speeds in the final member which increase in the relation of a geometrical progression, a branch transmission actuated by the prime mover, means selectively operable by the branch transmission for effecting rate changes in the variator, and dial means simultaneously actuated to indicate the particular rate of the progression effected.

LESTER F. NENNINGER.
SOL EINSTEIN.